(12) United States Patent
Zhuo et al.

(10) Patent No.: US 10,997,569 B2
(45) Date of Patent: May 4, 2021

(54) METHOD AND DEVICE FOR PROCESSING VIRTUAL CARDS

(71) Applicant: TENCENT TECHNOLOGY (SHENZHEN) COMPANY LIMITED, Shenzhen (CN)

(72) Inventors: Dacheng Zhuo, Shenzhen (CN); Wenrui Zhang, Shenzhen (CN); Meng Xiang, Shenzhen (CN); Jiandong Lin, Shenzhen (CN); Zhouwei Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 626 days.

(21) Appl. No.: 15/490,276

(22) Filed: Apr. 18, 2017

(65) Prior Publication Data

US 2017/0221024 A1    Aug. 3, 2017

Related U.S. Application Data

(63) Continuation of application No. PCT/CN2016/070468, filed on Jan. 8, 2016.

(30) Foreign Application Priority Data

Jan. 4, 2015  (CN) .......................... 201510003822.X
Jan. 12, 2015 (CN) .......................... 201510013916.5

(51) Int. Cl.
*G06Q 20/10* (2012.01)
*G06Q 10/06* (2012.01)
(Continued)

(52) U.S. Cl.
CPC .............. *G06Q 20/10* (2013.01); *G06Q 10/06* (2013.01); *G06Q 20/351* (2013.01); *H04L 51/046* (2013.01); *H04L 67/306* (2013.01)

(58) Field of Classification Search
CPC .... G06Q 20/10; G06Q 20/105; G06Q 20/351; G06Q 20/36; G06Q 20/40; H04L 51/046; H04L 67/306
(Continued)

(56) References Cited

U.S. PATENT DOCUMENTS 7,587,499 B1    9/2009  Haghpassand
2005/0192896 A1* 9/2005  Hutchison .............. G06Q 20/10
                                                            705/40
(Continued)

FOREIGN PATENT DOCUMENTS

CN         101038651 A     9/2007
CN         101073064 A    11/2007
(Continued)

OTHER PUBLICATIONS

Edward A. Morse and Vasant Raval. PCI DSS: Payment Card Industry Data Security Standards in Context. Computer law & Security Review. vol. 24, Issue 6, pp. 540-554 (2008). (Year: 2008).*

(Continued)

*Primary Examiner* — Virpi H Kanervo
(74) *Attorney, Agent, or Firm* — Anova Law Group, PLLC

(57) ABSTRACT

A transfer request is received from a terminal, in which the transfer request carries a user identity (ID) of a first user, a user ID of a second user, and a virtual card ID of the first user; the virtual card is transferred from user account of first user to user account of second user, based on the user ID of the first user, the user ID of the second user and the virtual card ID; an image for transferring the virtual card is obtained; an image library of the virtual card is obtained; an image ID and the image are stored into the image library of the virtual card.

14 Claims, 9 Drawing Sheets

(51) Int. Cl.
*G06Q 20/34* (2012.01)
*H04L 12/58* (2006.01)
*H04L 29/08* (2006.01)

(58) Field of Classification Search
USPC .......................................................... 705/39
See application file for complete search history.

(56) References Cited

U.S. PATENT DOCUMENTS

| | | | |
|---|---|---|---|
| 2008/0027920 A1 | 1/2008 | Schipunov et al. | |
| 2008/0288404 A1* | 11/2008 | Pirzadeh ................. | G06F 21/31 705/44 |
| 2011/0125638 A1* | 5/2011 | Davis ..................... | G06Q 20/02 705/41 |
| 2011/0209146 A1 | 8/2011 | Box et al. | |
| 2011/0302084 A1* | 12/2011 | Melik-Aslanian ..... | G06Q 20/24 705/44 |
| 2012/0197794 A1* | 8/2012 | Grigg .................. | G06Q 20/405 705/41 |
| 2013/0159154 A1* | 6/2013 | Purves .................. | G06Q 20/36 705/35 |
| 2014/0214665 A1* | 7/2014 | Lee ...................... | G06Q 20/227 705/41 |
| 2014/0359714 A1* | 12/2014 | Pluss .................... | H04W 4/60 726/4 |
| 2015/0006377 A1 | 1/2015 | Kang | |
| 2015/0134540 A1* | 5/2015 | Law ...................... | G06O 20/02 705/72 |
| 2015/0363754 A1* | 12/2015 | Hosp ..................... | G06Q 10/107 705/39 |
| 2018/0144335 A1* | 5/2018 | Vityaz ................. | G06F 21/6245 |

FOREIGN PATENT DOCUMENTS

| | | | |
|---|---|---|---|
| CN | 101192287 A | 6/2008 | |
| CN | 101996376 A | 3/2011 | |
| CN | 102947796 A | 2/2013 | |
| CN | 103327086 A | 9/2013 | |
| CN | 103870965 A | 6/2014 | |
| CN | 104601448 A | 5/2015 | |
| CN | 104680307 A | 6/2015 | |
| KR | 2009-0035545 A | 4/2009 | |
| KR | 2013-0137484 A | 12/2013 | |
| KR | 2015-0001875 A | 1/2015 | |
| WO | WO-2009074849 A1 * | 6/2009 | ........... G06Q 20/385 |

OTHER PUBLICATIONS

Search Report in International Application No. PCT/CN2016/070468 dated Mar. 24, 2016, 4 pages.
Office Action in CN Application No. 201510013916.5 dated May 23, 2017, 6 pages.
Extended European Search Report in EP Application No. 16732878.0 dated Apr. 30, 2018, nine pages.
Office Action in Korean Application No. 10-2017-7012412 dated Jan. 12, 2018, 11 pages.
International Preliminary Report on Patentability and Written Opinion in International Application No. PCT/CN2016/070468 dated Jul. 4, 2017, 7 pages.
Office Action in CN Application No. 201510003822X dated Jun. 25, 2018, 7 pages, with concise explanaction of relevance.

* cited by examiner

METHOD AND DEVICE FOR PROCESSING VIRTUAL CARDS

This application claims priority to a Chinese patent application No. 2015100139165, titled "method and device for processing virtual cards", which was filed on Jan. 12, 2015. The disclosures of the application No. 2015100139165 are incorporated here by reference.

This application claims priority to a Chinese patent application No. 201510003822X, titled "method and device for processing item transactions", which was filed on Jan. 4, 2015. The disclosures of the application No. 201510003822X are incorporated here by reference.

TECHNICAL FIELD

The present disclosure relates to Internet fields, and more particularly, to a method and device for processing virtual cards.

BACKGROUND

Accompanying with rapid developments of Internet technologies, functions of Instant Messaging (IM) applications become stronger. At present, functions of a virtual card have been incorporated into IM applications. A virtual card refers to a virtual account, which includes a resource value and a card number.

A user may obtain a virtual card by using an IM application. After the user obtains the virtual card by using the IM application, a server stores the virtual card into the user account of the user. When other users want to use the virtual card, how to deal with the virtual card is the focus of the industry.

SUMMARY

Embodiments of the present disclosure provide a method and device for processing a virtual card. The technical solutions are as follows.

In the first aspect, a method for processing a virtual card, including:

receiving a transfer request from a terminal, in which the transfer request carries a user ID of a first user, a user ID of a second user and a virtual card ID of the first user;

transferring the virtual card from a user account of the first user to a user account of the second user, based on the user ID of the first user, the user ID of the second user and the virtual card ID;

obtaining an image for transferring the virtual card, wherein the image at least includes the user ID of the first user, the user ID of the second user, the virtual card ID, and a resource value of the virtual card;

obtaining an image library of the virtual card, storing an image ID and the image into the image library of the virtual card.

In the first possible implementation mode of the first aspect, the method further includes:

after storing the image ID and the image into the image library of the virtual card, receiving a query request from the terminal, wherein the query request carries the virtual card ID and the image ID;

obtaining the image library of the virtual card based on the virtual card ID, and obtaining the image corresponding to the image ID from the image library of the virtual card; and, transmitting the obtained image to the terminal.

Take into account any possible implementation mode in the first aspect, in the second possible implementation mode of the first aspect, obtaining the image for transferring the virtual card includes:

obtaining the resource value of the virtual card from a corresponding relationship, which is between a virtual card ID of a virtual card and a resource value of the virtual card, based on the virtual card ID; and, generating the image for transferring the virtual card, based on the user ID of the first user, the user ID of the second user, the virtual card ID and the resource value of the virtual card.

Take into account any possible implementation mode of the first aspect, in the third possible implementation mode of the first aspect, transferring the virtual card from the user account of the first user to the user account of the second user, based on the user ID of the first user, the user ID of the second user and the virtual card ID, includes:

obtaining an account relationship table, wherein the account relationship table is configured to store a corresponding relationship, which is between a virtual card ID and a user ID of a user;

replacing a first corresponding relationship in the account relationship table with a second corresponding relationship, wherein the first corresponding relationship is between the virtual card ID and the user ID of the first user, the second corresponding relationship is between the virtual card ID and the user ID of the second user.

Take into account any possible implementation mode of the first aspect, in the fourth possible implementation mode of the first aspect, obtaining the image library of the virtual card includes:

determining whether a server includes the image library of the virtual card, based on the virtual card ID;

when determining that the server includes the image library of the virtual card, obtaining the image library of the virtual card from the server; otherwise, creating an image library for the virtual card.

Take into account any possible implementation mode of the first aspect, in the fifth possible implementation mode of the first aspect, the method further includes:

after receiving the transfer request from the terminal, recording a state of the virtual card before executing the transfer request;

when transferring of the virtual card is failed, restoring the state of the virtual card before executing a virtual-card transfer transaction.

Take into account any possible implementation mode of the first aspect, in the sixth possible implementation mode of the first aspect, recording the state of the virtual card before executing the transfer request includes:

creating the virtual-card transfer transaction corresponding to the virtual card;

recording an associated state of the virtual card, before executing the virtual-card transfer transaction, wherein the virtual-card transfer transaction includes an associated relationship between the first user and the virtual card, and an associated relationship between the second user and the virtual card;

wherein when the transferring of the virtual card is failed, restoring the state of the virtual card before executing the virtual-card transfer transaction includes:

restoring the associated state of the virtual card before executing the virtual-card transfer transaction.

In a second aspect, a device for processing a virtual card is provided, which includes a first receiving module, a transferring module, a first obtaining module, a second obtaining module and a storing module, in which the first receiving module is configured to receive a transfer request from a terminal, wherein the transfer request carries a user ID of a first user, a user ID of a second user and a virtual card ID of the first user;

the transferring module is configured to transfer the virtual card from a user account of the first user to a user account of the second user, based on the user ID of the first user, the user ID of the second user and the virtual card ID;

the first obtaining module is configured to obtain an image for transferring the virtual card, wherein the image at least includes the user ID of the first user, the user ID of the second user, the virtual card ID, and a resource value of the virtual card;

the second obtaining module is configured to obtain an image library of the virtual card; and, the storing module is configured to store an image ID and the image into the image library of the virtual card.

In the first possible implementation mode of the second aspect, the device further includes a second receiving module, a third obtaining module and a transmitting module, in which:

the second receiving module is configured to receive a query request from the terminal, wherein the query request carries the virtual card ID and the image ID;

the third obtaining module is configured to obtain the image library of the virtual card based on the virtual card ID, and obtain the image corresponding to the image ID from the image library of the virtual card; and, the transmitting module is configured to transmit the obtained image to the terminal.

Take into account any possible implementation mode in the second aspect, in the second possible implementation mode of the second aspect, the first obtaining module includes a first obtaining unit and a generating unit, in which:

the first obtaining unit is configured to obtain the resource value of the virtual card from a corresponding relationship, which is between a virtual card ID of a virtual card and a resource value of the virtual card, based on the virtual card ID; and, the generating unit is configured to generate the image for transferring the virtual card, based on the user ID of the first user, the user ID of the second user, the virtual card ID and the resource value of the virtual card.

Take into account any possible implementation mode in the second aspect, in the third possible implementation mode of the second aspect, the transferring module includes a second obtaining unit and a modifying unit, in which:

the second obtaining unit is configured to obtain an account relationship table, wherein the account relationship table is configured to store a corresponding relationship, which is between a virtual card ID and a user ID of a user;

the modifying unit is configured to replace a first corresponding relationship in the account relationship table with a second corresponding relationship, wherein the first corresponding relationship is between the virtual card ID and the user ID of the first user, the second corresponding relationship is between the virtual card ID and the user ID of the second user.

Take into account any possible implementation mode in the second aspect, in the fourth possible implementation mode of the second aspect, the second obtaining module includes a determining unit, a third obtaining unit and a creating unit, in which:

the determining unit is configured to determine whether a server includes the image library of the virtual card, based on the virtual card ID;

when the server includes the image library of the virtual card, the third obtaining unit is configured to obtain the image library of the virtual card from the server;

when the server does not include the image library of the virtual card, the creating unit is configured to create an image library for the virtual card.

In a third aspect, a device for processing a virtual card is provided, including: a processor, and a memory for storing instructions executable by the processor, wherein when executing the instructions, the processor is configured to:

receive a transfer request from a terminal, wherein the transfer request carries a user ID of a first user, a user ID of a second user and a virtual card ID of the first user;

transfer the virtual card from a user account of the first user to a user account of the second user, based on the user ID of the first user, the user ID of the second user and the virtual card ID;

obtain an image for transferring the virtual card, wherein the image at least includes the user ID of the first user, the user ID of the second user, the virtual card ID, and a resource value of the virtual card;

obtain an image library of the virtual card, store an image ID and the image into the image library of the virtual card.

In a possible implementation mode, the processor is further configured to:

receive a query request from the terminal, wherein the query request carries the virtual card ID and the image ID;

obtain the image library of the virtual card based on the virtual card ID, and obtain the image corresponding to the image ID from the image library of the virtual card; and, transmit the obtained image to the terminal.

In a possible implementation mode, the processor is further configured to:

obtain the resource value of the virtual card from a corresponding relationship, which is between a virtual card ID of a virtual card and a resource value of the virtual card, based on the virtual card ID; and, generate the image for transferring the virtual card, based on the user ID of the first user, the user ID of the second user, the virtual card ID and the resource value of the virtual card.

In a possible implementation mode, the processor is further configured to:

obtain an account relationship table, wherein the account relationship table is configured to store a corresponding relationship, which is between a virtual card ID and a user ID of a user;

replace a first corresponding relationship in the account relationship table with a second corresponding relationship, wherein the first corresponding relationship is between the virtual card ID and the user ID of the first user, the second corresponding relationship is between the virtual card ID and the user ID of the second user.

In a possible implementation mode, the processor is further configured to:

determine whether a server includes the image library of the virtual card, based on the virtual card ID;

when determining that the server includes the image library of the virtual card, obtain the image library of the virtual card from the server;

when determining that the server does not include the image library of the virtual card, create an image library for the virtual card.

In a possible implementation mode, the processor is further configured to:

record a state of the virtual card before executing the transfer request;

when transferring of the virtual card is failed, restore the state of the virtual card before executing a virtual-card transfer transaction.

In a possible implementation mode, the processor is further configured to:

create the virtual-card transfer transaction corresponding to the virtual card;

record an associated state of the virtual card, before executing the virtual-card transfer transaction, wherein the virtual-card transfer transaction includes an associated relationship between the first user and the virtual card, and an associated relationship between the second user and the virtual card;

restore the associated state of the virtual card before executing the virtual-card transfer transaction, when transferring of the virtual card is failed.

In a fourth aspect, a method for processing an item transaction is provided, including:

receiving an item processing request, wherein the item processing request carries a target item ID;

creating an item processing transaction corresponding to a target item, based on the item processing request, which includes: creating an item processing transaction ID based on the target item ID, and recording a state of the target item before executing the item processing transaction;

executing the item processing transaction corresponding to the target item, based on the item processing transaction ID, when execution is failed, restoring the state of the target item before executing the item processing transaction, based on the item processing transaction ID.

The target item may be a virtual card, and so on. For example, the item processing request may be a transfer request for the virtual card. That is, the first user gives the virtual card to another user as a gift. Alternatively, the item processing request may be a transfer request for the resource value in the virtual card. That is, the first user gives all or some of the resource value in the virtual card to another user as a gift, and so on.

In a possible implementation mode, the item processing request includes an item transfer request, and the item transfer request carries the target item ID, a transferer account ID and a transferee account ID;

wherein when receiving the item transfer request, creating the item processing transaction corresponding to the target item, based on the item processing request, and recording the state of the target item before executing the item processing transaction include:

creating an item transfer transaction corresponding to the target item, based on the target item ID, which include: creating an item transfer transaction ID based on the target item ID, recording an associated state of the target item before executing the item transfer transaction, wherein the item transfer transaction includes removing an associated relationship between the transferer account ID and the target item, and establishing an associated relationship between the transferee account ID and the target item;

wherein executing the item processing transaction corresponding to the target item, based on the item processing transaction ID; when execution is failed, restoring the state of the target item before executing the item processing transaction, based on the item processing transaction ID, include:

executing the item transfer transaction corresponding to the target item, based on the item transfer transaction ID; when execution is failed, restoring the associated state of the target item before executing the item transfer transaction, based on the item transfer transaction ID.

In a possible implementation mode, the method further includes:

before creating the item processing transaction corresponding to the target item, based on the item processing request, determining whether there is ongoing item processing transaction for the target item, based on the item processing transaction ID.

In a possible implementation mode, the method further includes:

before receiving the item processing request, which carries the target item ID, transmitting item information associated with a user account of a user terminal to the user terminal, and receiving the item processing request submitted by the user terminal, which is in response to a transaction operation instruction inputted by a user for the item information.

In a fifth aspect, a device for processing an item transaction is provided, which includes a transaction request obtaining module, an item-transaction creating module and a transaction processing module;

the transaction request obtaining module is configured to receive an item processing request, wherein the item processing request carries a target item ID;

the item-transaction creating module is configured to create an item processing transaction corresponding to a target item, based on the item processing request, including: creating an item processing transaction ID based on the target item ID, and recording a state of the target item before executing the item processing transaction;

the transaction processing module is configured to execute the item processing transaction corresponding to the target item, based on the item processing transaction ID, when execution is failed, restore the state of the target item before executing the item processing transaction, based on the item processing transaction ID.

In a possible implementation mode, the item processing request includes an item transfer request, and the item transfer request carries the target item ID, a transferer account ID and a transferee account ID;

when the transaction request obtaining module obtains the item transfer request, the item-transaction creating module is configured to:

create an item transfer transaction corresponding to the target item, based on the target item ID, including:

creating an item transfer transaction ID based on the target item ID, recording an associated state of the target item before executing the item transfer transaction, wherein the item transfer transaction indicates to remove an associated relationship between the transferer account ID and the target item, and establish an associated relationship between the transferee account ID and the target item;

wherein the transaction processing module is configured to:

execute the item transfer transaction corresponding to the target item, based on the item transfer transaction ID, when execution is failed, restore the associated state of the target item before executing the item transfer transaction, based on the item transfer transaction ID.

In a possible implementation mode, the device further includes an item-transaction managing module, which is configured to:

after receiving the item processing request, determine whether there is an ongoing item processing transaction for the target item, based on the item processing transaction ID;

when there is no ongoing item processing transaction for the target item, trigger the item-transaction creating module to create the item processing transaction corresponding to the target item, based on the item processing request, and record the state of the target item before executing the item processing transaction.

In a possible implementation mode, the device further includes an item information transmitting module, which is configured to transmit item information associated with a user account of a user terminal to the user terminal;

and the transaction request obtaining module is configured to receive the item processing request submitted by the user terminal, which is in response to a transaction operation instruction inputted by a user for the item information.

In the sixth aspect, a device for processing an item transaction is provided, including:

a processor;

a memory for storing instructions executable by the processor;

wherein when executing the instructions, the processor is configured to:

receive an item processing request, wherein the item processing request carries a target item ID;

create an item processing transaction corresponding to a target item, based on the item processing request, including: creating an item processing transaction ID based on the target item ID, and recording a state of the target item before executing the item processing transaction;

execute the item processing transaction corresponding to the target item, based on the item processing transaction ID, when execution is failed, restore the state of the target item before executing the item processing transaction, based on the item processing transaction ID.

In a possible implementation mode, the processor is further configured to:

the item processing request includes an item transfer request, and the item transfer request carries the target item ID, a transferer account ID and a transferee account ID;

when obtaining the item transfer request, create an item transfer transaction corresponding to the target item, based on the target item ID, including:

creating an item transfer transaction ID based on the target item ID, recording an associated state of the target item before executing the item transfer transaction, wherein the item transfer transaction indicates to remove an associated relationship between the transferer account ID and the target item, and establish an associated relationship between the transferee account ID and the target item;

execute the item transfer transaction corresponding to the target item, based on the item transfer transaction ID, when execution is failed, restore the associated state of the target item before executing the item transfer transaction, based on the item transfer transaction ID.

In a possible implementation mode, the processor is further configured to:

after receiving the item processing request, determine whether there is an ongoing item processing transaction for the target item, based on the item processing transaction ID;

when there is no ongoing item processing transaction for the target item, create the item processing transaction corresponding to the target item, based on the item processing request, and record the state of the target item before executing the item processing transaction.

In a possible implementation mode, the processor is further configured to:

transmit item information associated with a user account of a user terminal to the user terminal;

receive the item processing request submitted by the user terminal, which is in response to a transaction operation instruction inputted by a user for the item information.

By adopting the technical solutions provided by the embodiments in the present disclosure, the following advantages may be achieved.

In the present disclosure, a transfer request is received from a terminal. The transfer request carries a user ID of a first user, a user ID of a second user, and a virtual card ID of the first user. The virtual card is transferred from user account of the first user to user account of the second user, based on the user ID of the first user, the user ID of the second user and the virtual card ID. An image for transferring the virtual card is obtained. The image at least includes the user ID of the first user, the user ID of the second user, the virtual card ID and a resource value of the virtual card. An image library of the virtual card is obtained. The image ID and the image are stored in the image library of the virtual card. In the present disclosure, the virtual card of the first user may be transferred to the second user, and the image for transferring the virtual card may be stored.

BRIEF DESCRIPTIONS OF THE DRAWINGS

To describe technical solutions in the embodiments of the present disclosure more clear, simple introductions are provided for attached figures, which are used when describing the embodiments. Obviously, attached figures in the following descriptions only illustrate some embodiments. For persons having ordinary skill in the art, other attached figures may be obtained based on such attached figures, without paying creative work.

FIG. 2-1 is a flowchart illustrating a method for processing a virtual card, in accordance with Embodiment 2 of the present disclosure.

FIG. 2-2 is a schematic diagram illustrating how to transfer a virtual card, in accordance with Embodiment 2 of the present disclosure.

FIG. 2-3 is a schematic diagram illustrating structure of an image library of a virtual card, which is stored in a server, in accordance with Embodiment 2 of the present disclosure.

FIG. 2-4 is a schematic diagram illustrating a case in the prior art, where a fault occurs during a process for dealing with an item transaction.

FIG. 3 is a schematic diagram illustrating structure of a device for processing a virtual card, in accordance with Embodiment 3 of the present disclosure.

FIG. 4 is a schematic diagram illustrating structure of a server, in accordance with Embodiment 4 of the present disclosure.

DETAILED DESCRIPTIONS

To make objectives, technical solutions and advantages of the present disclosure more clear, detailed descriptions of implementations in the present disclosure are further provided in the following, accompanying with attached figures.

Embodiment 1

Figure 1:
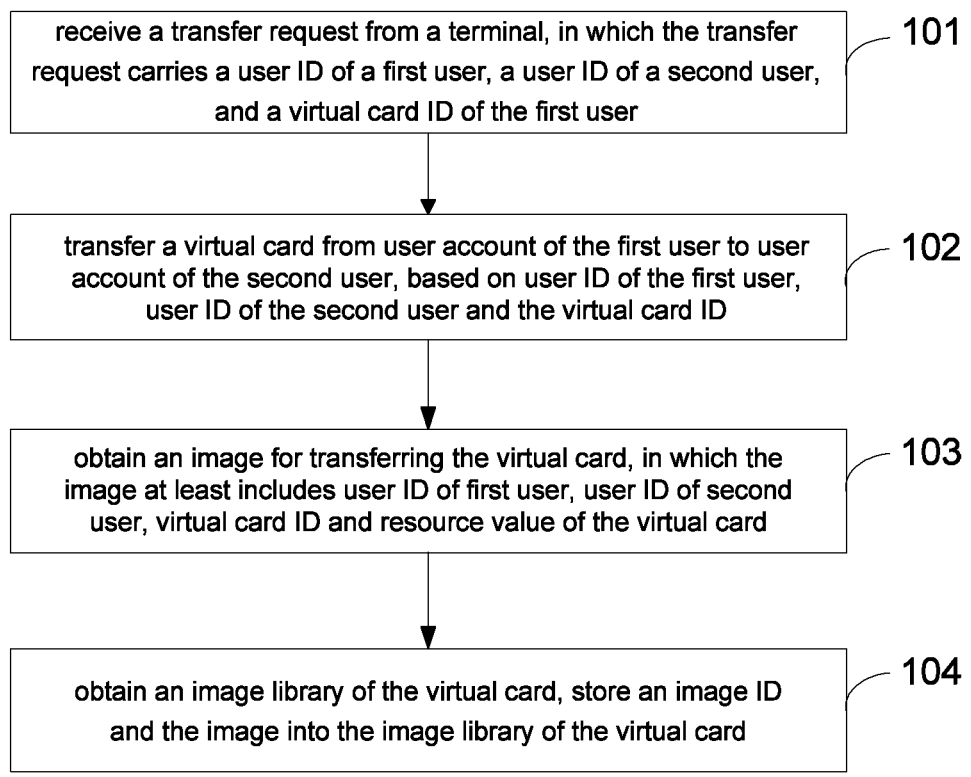
FIG. 1 is a flowchart illustrating a method for processing a virtual card, in accordance with Embodiment 1 of the present disclosure.

With reference to FIG. 1, an embodiment of the present disclosure provides a method for processing a virtual card, which includes the following blocks.

In block 101, receive a transfer request from a terminal; in which the transfer request carries a user identity (ID) of a first user, a user ID of a second user, and a virtual card ID of the first user.

In block 102: transfer the virtual card from user account of the first user to user account of the second user, based on the user ID of the first user, the user ID of the second user, and the virtual card ID.

In block 103: obtain an image for transferring the virtual card, in which the image at least includes the user ID of the first user, the user ID of the second user, the virtual card ID, and a resource value of the virtual card.

In block 104: obtain an image library of the virtual card, store an image ID and the image into the image library of the virtual card.

In the present disclosure, receive the transfer request from the terminal, in which the transfer request carries the user ID of the first user, the user ID of the second user, and the virtual card ID of the first user; transfer the virtual card from the user account of the first user to the user account of the second user, based on the user ID of the first user, the user ID of the second user and the virtual card ID; obtain an image for transferring the virtual card, in which the image at least includes the user ID of the first user, the user ID of the second user, the virtual card ID and the resource value of the virtual card; obtain an image library of the virtual card, store the image ID and the image into the image library of the virtual card. In the present disclosure, a virtual card of the first user may be transferred to the second user, and an image for transferring the virtual card may be stored.

Embodiment 2

Figures 1, 2:
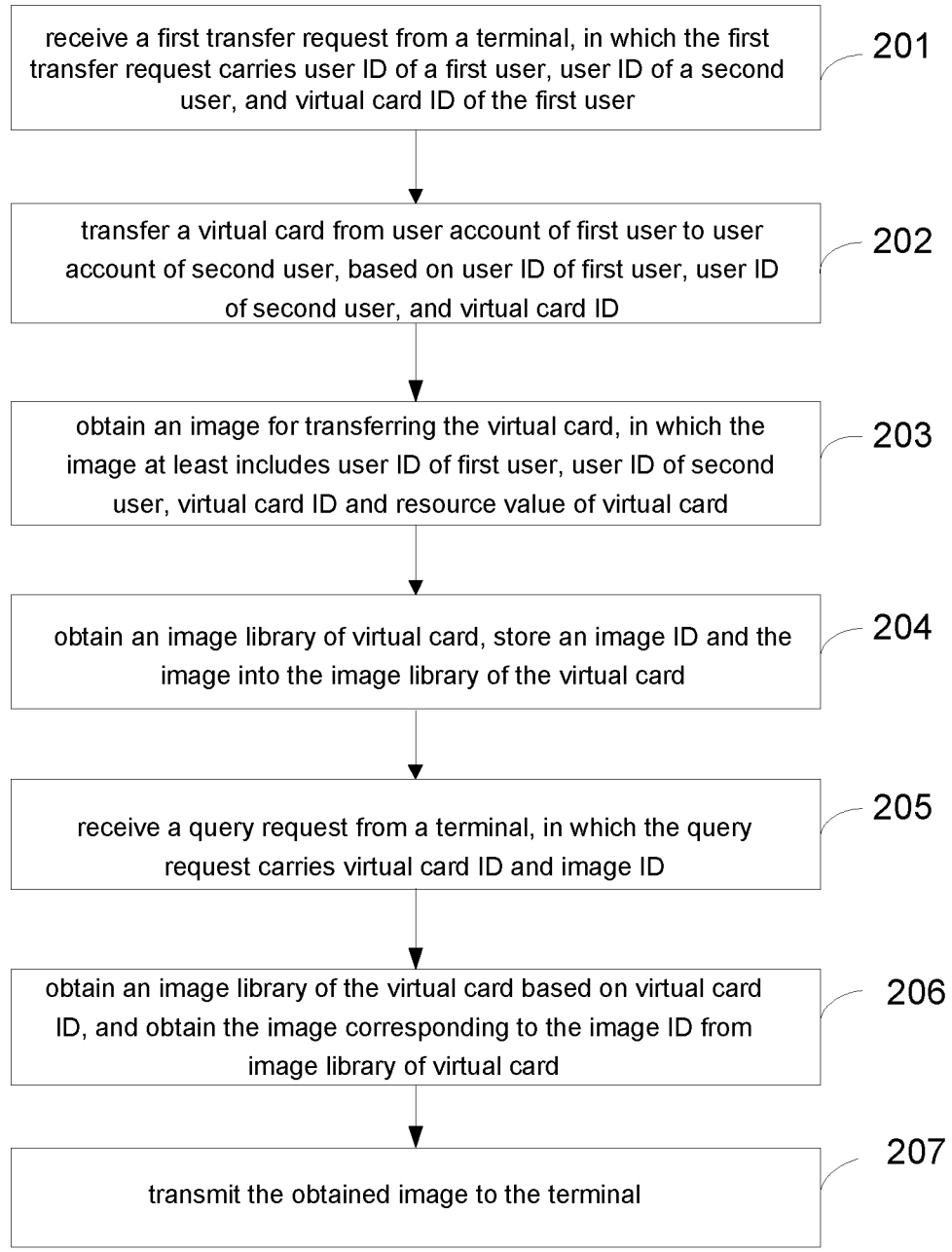
Figure 2:
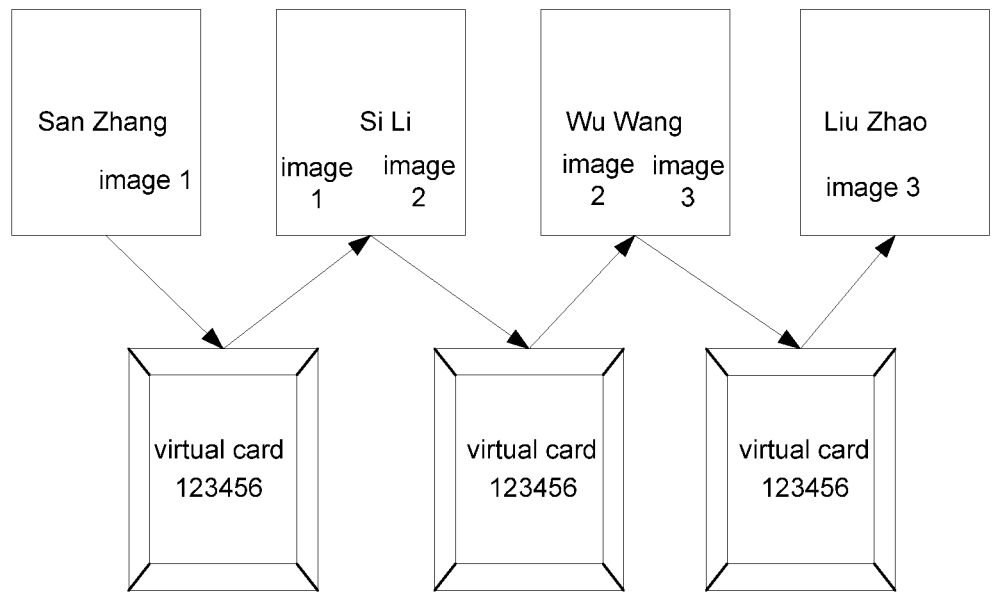

With reference to FIG. 2-1, an embodiment of the present disclosure provides a method for processing a virtual card. The execution entity of the method may be a server. After a first user obtains a virtual card in an IM application, the virtual card of the first user may be processed, based on the method provided by the embodiment of the present disclosure.

The method includes the following blocks.

In block 201: receive a transfer request for transferring a virtual card from a terminal, in which the transfer request carries the user ID of a first user, the user ID of a second user, and a virtual card ID of the first user.

When the first user wants to transfer a virtual card of the first user to the second user, a terminal corresponding to the first user transmits the transfer request to a server. The transfer request carries the user ID of the first user, the user ID of the second user, and the virtual card ID of the first user. The server receives the transfer request from the terminal, obtains the user ID of the first user, the user ID of the second user, and the virtual card ID of the first user from the transfer request, and proceeds with block 202.

In the block, the transfer request may only carry the user ID of the first user, and the user ID of the second user. The server obtains the virtual card ID of the first user from an account relationship table, based on the user ID of the first user. The account relationship table is configured to store a corresponding relationship, which is between user ID of each user and a virtual card ID of a virtual card possessed by each user.

When the user account of the first user only includes one virtual card, after obtaining the virtual card ID of the first user from the account relationship table, proceed with block 202. When the user account of the first user includes multiple virtual cards, after obtaining multiple virtual card IDs of the first user from the account relationship table, transmit the multiple virtual card IDs of the first user to the terminal. The terminal receives the multiple virtual card IDs of the first user from the server, receives a virtual card ID selected by a user from the multiple virtual card IDs, and transmits the virtual card ID selected by the user to the server. The server receives the virtual card ID selected by the user from the terminal, and then proceeds with block 202.

The virtual card ID may be a virtual card number, and so on. The user ID of the first user may be name of the first user, or user account registered by the first user in the server. The user ID of the second user may be name of the second user, or user account registered by the second user in the server, and so on. The terminal may be a mobile phone, a computer, or a tablet computer, and so on.

For example, the user ID of the first user is San Zhang, the user ID of the second user is Si Li. The virtual card ID of the first user is 123456. When San Zhang wants to transfer virtual card 123456 to Si Li, San Zhang transmits a transfer request to a server. The transfer request carries the user ID of the first user: San Zhang, the user ID of the second user: Si Li, and virtual card ID of the first user: 123456.

In block 202: transfer the virtual card from the user account of the first user to the user account of the second user, based on the user ID of the first user, the user ID of the second user, and the virtual card ID.

Block 202 may be implemented, by executing (1) and (2) in the following.

(1): obtain an account relationship table, in which the account relationship table is configured to store a corresponding relationship between a virtual card ID and a user ID of a user.

The account relationship table is configured to store a corresponding relationship, which is between a user ID of each user and a virtual card ID of a virtual card possessed by each user. When a first user wants to transfer the virtual card of the first user to a second user, the server firstly obtains the account relationship table, and then proceeds with block (2).

For example, the account relationship table obtained by the server is shown in Table 1 as follows.

TABLE 1

| Virtual card ID | User ID |
| --- | --- |
| 123456 | San Zhang |
| 234567 | Wu Wang |
| ... | ... |

(2): replace a first corresponding relationship in the account relationship table with a second corresponding relationship. The first corresponding relationship is between the virtual card ID and the user ID of the first user. The second corresponding relationship is between the virtual card ID and the user ID of the second user.

The server removes the first corresponding relationship from the account relationship table, and adds the second corresponding relationship to the account relationship table; or, the server changes the user account corresponding to the virtual card ID in the account relationship table from the user ID of the first user to the user ID of the second user.

For example, the server replaces a corresponding relationship between virtual card 123456 and San Zhang in Table 1 with another corresponding relationship, which is between virtual card 123456 and Si Li, as shown in Table 2:

TABLE 2

| Virtual card ID | User ID |
| --- | --- |
| 123456 | Si Li |
| 234567 | Wu Wang |
| ... | ... |

In block 203: obtain an image for transferring the virtual card, in which the image at least includes the user ID of the first user, the user ID of the second user, the virtual card ID, and resource value of the virtual card.

Block 203 may be achieved with following (1) and (2), including:

(1): obtain the resource value of the virtual card from the corresponding relationship, which is between a virtual card ID of a virtual card and a resource value of the virtual card, based on the virtual card ID.

The corresponding relationship between a virtual card ID of a virtual card and a resource value of the virtual card is configured to store a corresponding relationship, which is between a virtual card ID of each virtual card in the server and a resource value of each virtual card.

For example, the server stores a corresponding relationship shown in FIG. 3 as follows. The corresponding relationship is between a virtual card ID of each virtual card and a resource value of each virtual card.

TABLE 3

| Virtual card ID | Resource value |
| --- | --- |
| 123456 | 50 |
| 234567 | 100 |
| ... | ... |

For example, the server obtains resource value 50 of the virtual card from the corresponding relationship, which is between a virtual card ID of a virtual card and a resource value of the virtual card shown in Table 3, based on virtual card ID 123456.

Furthermore, the server may obtain current time, and take current time as transfer time of the virtual card.

For example, the transfer time of the virtual card is 2014-12-17, 10:00.

(2): generate an image for transferring the virtual card, based on the user ID of the first user, the user ID of the second user, the virtual card ID and resource value of the virtual card.

The image for transferring the virtual card at least includes the user ID of the first user, the user ID of the second user, the virtual card ID and resource value of the virtual card. The foregoing image may further include picture and/or transfer time of the virtual card, and so on.

After obtaining the virtual card, the second user may transfer the virtual card to other users.

For example, San Zhang transfers virtual card 123456 to Si Li. Image 1 for transferring the virtual card is generated. Image 1 is: San Zhang transfers a virtual card 123456 to Si Li on 10:00, 2014-12-17; resource value of the virtual card 123456 is 50, and so on; after obtaining the virtual card, Si Li may also transfer the virtual card to Wu Wang, at this time, the server generates image 2 for transferring the virtual card. After obtaining the virtual card, Wu Wang may still transfer the virtual card to Liu Zhao. At this time, the server generates image 3 for transferring the virtual card as shown in FIG. 2-2.

In block 204: obtain an image library of the virtual card, store the image ID and the image into the image library of the virtual card.

The image library is configured to store a corresponding relationship, which is between an image ID of a virtual card and an image of the virtual card. The image library includes the virtual card ID, which is shown in FIG. 2-3.

Block 204 may be implemented with following (1) to (4), including:

(1), determine whether the server includes the image library of the virtual card, based on the virtual card ID. When determining that the server includes the image library of the virtual card, proceed with block (2); otherwise, proceed with block (3).

When the first user transfers the virtual card for the first time, the server creates an image library for the virtual card, and stores the virtual card ID into the image library of the virtual card. In the block, determine whether the image library of the virtual card exists in the server, based on the virtual card ID. When the image library of the virtual card exists, determine that the server includes the image library of the virtual card, and proceed with block (2); otherwise, when the image library of the virtual card does not exist, determine that the server does not include the image library of the virtual card, and proceed with block (3).

(2): obtain the image library of the virtual card from the server, and proceed with (4);

Take the image library including the virtual card, which is obtained from the server, as the image library of the virtual card.

(3): create an image library for the virtual card.

Create one image library for the virtual card. Store the virtual card ID into the created image library.

(4): store the image ID and the image into the image library of the virtual card.

Each time the virtual card is transferred, the server generates an image for transferring the virtual card, stores the image ID and the image into the image library of the virtual card.

The image ID may be a combination of the user ID of the first user, the user ID of the second user, and transfer time, and so on.

For example, San Zhang transfers a virtual card 123456 to Si Li on 10:00, 2014-12-17. The image ID of virtual card 123456 with resource value 50 is: San Zhang+Si Li+2014-12-17, 10:00.

A corresponding relationship among the image ID: San Zhang+Si Li+2014-12-17, 10:00, the image: San Zhang transfers the virtual card 123456 to Si Li on 10:00, 2014-12-17, and resource value 50 of the virtual card 123456 is stored into the image library of the virtual card, based on the image library ID of the virtual card: image library 1.

Furthermore, after storing the image ID and the image into the image library of the virtual card, transmit the image to a terminal corresponding to the first user, and/or, a terminal corresponding to the second user.

When the first user, or the second user wants to view the image, the image may be obtained by executing following blocks 205 to 207.

In block 205: receive a query request from a terminal, in which the query request carries the virtual card ID and the image ID.

When the first user or second user wants to view the image, the terminal transmits the query request to the server. The query request carries the virtual card ID and the image ID. The server receives the query request from the terminal, obtains the virtual card ID and the image ID from the query request. Proceed with block 206.

For example, when San Zhang wants to view the image, the terminal corresponding to San Zhang transmits a query request to the server. The query request carries the virtual card ID: 123456, and image ID: San Zhang+Si Li+2014-12-17, 10:00. The server receives the query request from the terminal, obtains virtual card ID: 123456 and image ID: San Zhang+Si Li+2014-12-17, 10:00 from the query request.

Furthermore, the query request may only carry the virtual card ID. The server obtains the virtual card ID from the query request.

In block 206: obtain the image library of the virtual card, based on the virtual card ID; obtain the image corresponding to the image ID from the image library of the virtual card.

Specifically, obtain the image library including the virtual card ID from the server, based on the virtual card ID. Obtain the image corresponding to the image ID from the image library of the virtual card, based on the image ID.

For example, obtain the image library including the virtual card 123456 from the server, based on the virtual card ID 123456. Obtain an image: San Zhang transfers the virtual card 123456 to Si Li on 10:00, 2014-12-17, resource value of the virtual card 123456 is 50, from the image library of virtual card 123456, which corresponds to image ID: San Zhang+Si Li+2014-12-17, 10:00, based on the image ID: San Zhang+Si Li+2014-12-17, 10:00.

Furthermore, when the query request only carries the virtual card ID, the server obtains the image library of the virtual card, based on the virtual card ID, and obtains all the images of the virtual card from the image library of the virtual card.

In block 207: transmit the obtained images to the terminal.

The terminal receives the images from the server, and displays the obtained images.

For example, transmit the image of the virtual card to the terminal. The image of the virtual card is: San Zhang transfers the virtual card 123456 to Si Li on 10:00, 2014-12-17, and resource value of the virtual card 123456 is 50. The terminal receives the image of the virtual card from the server, and displays the image of the virtual card. The image of the virtual card is: San Zhang transfers the virtual card 123456 to Si Li, on 10:00, 2014-12-17, and resource value of the virtual card 123456 is 50.

Furthermore, transmit all the images of the virtual card to the terminal.

In the embodiment, in addition to transferring the virtual card of the first user to another user (who is the second user), the first user may also transfer the resource value of his/her virtual card to another user, the specific process may be as follows.

(1): receive a transfer request for transferring a resource value from a terminal, in which the transfer request at least carries the user ID of the first user, the user ID of a third user, the virtual card ID of the first user and transfer value.

When the first user wants to transfer the resource value in the virtual card of the first user to the third user, the terminal corresponding to the first user transmits a transfer request to the server, in which the transfer request at least carries the user ID of the first user, the user ID of the third user, the virtual card ID of the first user and the transfer value. The transfer request may also carry the virtual card ID of the third user, and so on. The server receives the transfer request from the terminal, obtains the user ID of the first user, the user ID of the third user, the virtual card ID of the first user and the transfer value from the transfer request.

(2): Obtain the virtual card ID of the third user.

When the transfer request carries the virtual card ID of the third user, directly obtain the virtual card ID of the third user from the transfer request.

When the transfer request does not carry the virtual card ID of the third user, obtain the virtual card ID of the third user from the account relationship, based on the user ID of the third user.

(3): Determine whether the resource value in the virtual card of the first user is greater than or equal to the resource value, if yes, proceed with (4).

Obtain the resource value of the virtual card from a corresponding relationship, which is between a virtual card ID of a virtual card and a resource value of the virtual card, based on the virtual card ID of the first user. Determine whether resource value in the virtual card is greater than, or equal to the obtained resource value. When the resource value of the virtual card is greater than, or equal to the obtained resource value, that is, resource transfer is possible, proceed with block (4). When the resource value of the virtual card is less than the obtained resource value, prompt the first user that resource value is insufficient, and terminate the process.

(4): Transfer the transfer value in the virtual card of the first user to the virtual card of the third user.

Specifically, reduce the transfer value from the virtual card of the first user, and add the reduced transfer value to the virtual card of the third user.

Furthermore, after transferring the transfer value in the virtual card of the first user to the virtual card of the third user, transmit a notification message to the terminal. The notification message is configured to inform the first user that transfer is successful.

In the present disclosure, receive the transfer request from the terminal; the transfer request carries the user ID of the first user, the user ID of the second user, and the virtual card ID of the first user; transfer the virtual card from the user account of the first user to the user account of the second user, based on the user ID of the first user, the user ID of the second user, and the virtual card ID; obtain the image for transferring the virtual card; the image at least includes the user ID of the first user, the user ID of the second user, the virtual card ID and resource value of the virtual card; obtain the image library of the virtual card, store a corresponding relationship among virtual card ID, image ID and the image into the image library of the virtual card. By applying the present disclosure, the virtual card of the first user is transferred to the second user, and the image for transferring the virtual card may be stored.

Figures 2, 3:
Figures 2, 3, 4:
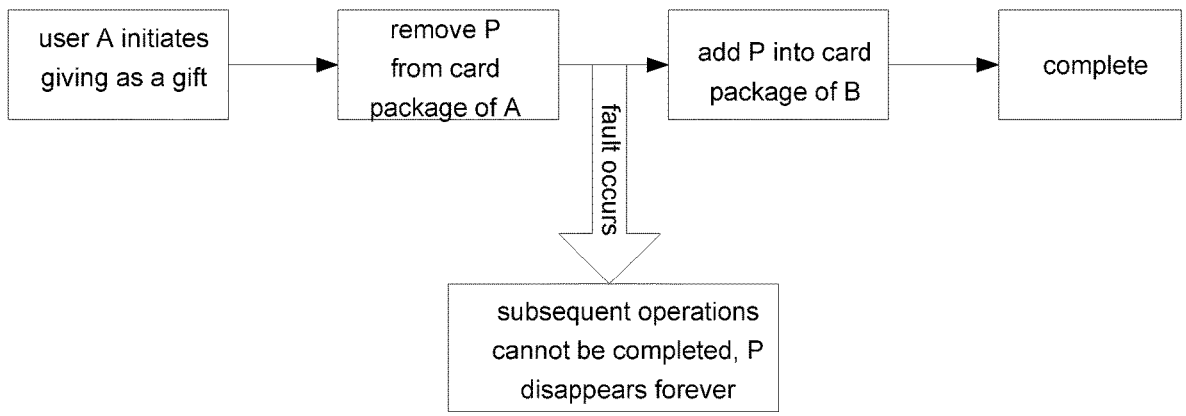
Figure 3:
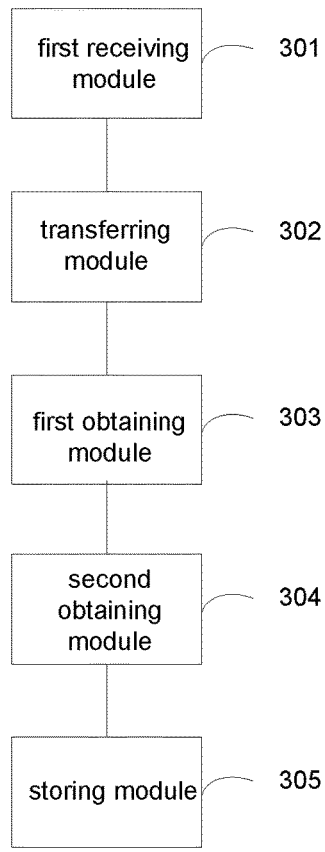
Figure 4:
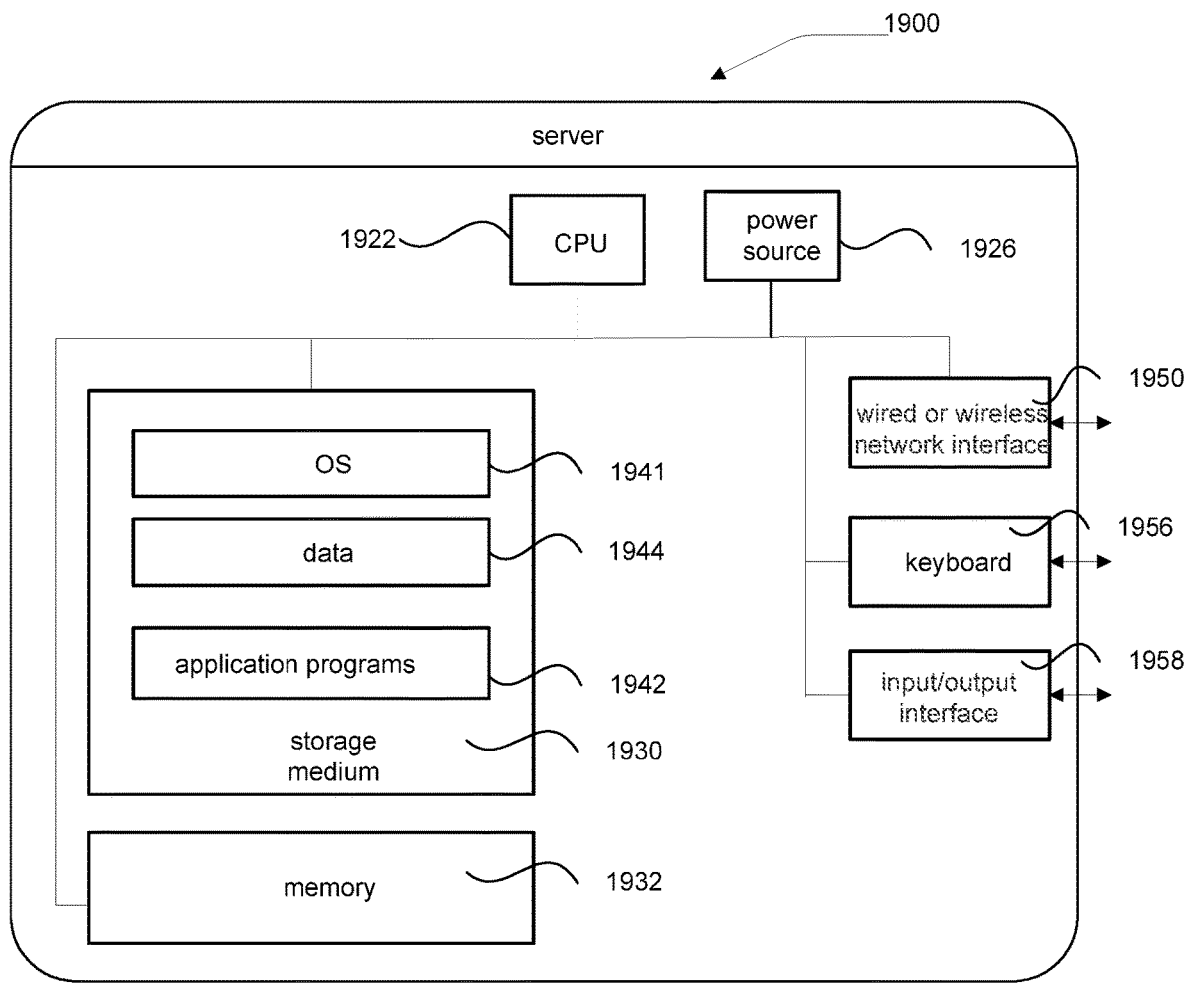

In practice, for a current management mode of virtual cards, the following scenes may often occur (as shown in FIG. 2-4): user A transmits a virtual card P to user B. In such a case, a system firstly removes the virtual card P from a card package of user A, and then adds the virtual card P into a card package of user B. When virtual card P has already been removed from the card package of user A, at this time, a fault may occur in a background server, such as, a broken network, a power outage, or restart, and then, the virtual card P is not added to the card package of user B. Thus, the virtual card P will disappear forever. That is, the virtual card P is neither in the card package of user A, nor in the card package of user B. Such errors undoubtedly bring huge inconvenience and loss to users. Thus, alternatively, when receiving the transfer request for transferring the virtual card from the terminal in block 201, the method may further include: record state of the virtual card before executing the transfer request. Specifically, for such transfer request, create a virtual-card transfer transaction corresponding to the virtual card, which includes: create a virtual-card transfer transaction ID based on the virtual card ID, and record associated state of the virtual card before executing the virtual-card transfer transaction. The virtual-card transfer transaction includes: remove the associated relationship between a transferer account (such as, the first user) and the virtual card; establish an associated relationship between a transferee account (such as, the second user) and the virtual card.

When a fault occurs in any block and lead to a failed virtual-card transfer transaction, restore the state of the virtual card before executing the virtual-card transfer transaction, based on the virtual-card transfer transaction ID, which includes:

execute the virtual-card transfer transaction corresponding to the virtual card, based on the virtual-card transfer transaction ID; when execution is failed, restore the associated state of the virtual card before executing the virtual-card transfer transaction, based on the virtual-card transfer transaction ID.

Similar to foregoing transfer request, for a virtual-card processing request, such as a virtual-card deleting request, a virtual-card using request, a virtual-card data changing request, establish a corresponding virtual-card processing transaction, and record associated state of the virtual card before executing the virtual-card processing transaction. The associated state includes, but is not limited to, an associated relationship, such as transfer-in and transfer-out of a virtual card, and also includes processing amount, such as transfer value, and so on.

On the basis of foregoing embodiments, create an item processing transaction corresponding to a target item according to the target item. Before executing the item processing transaction, record state of the target item before executing the item processing transaction, so as to effectively guarantee independence and stability of item transaction execution.

Embodiment 3

With reference to FIG. 3, an embodiment of the present disclosure provides a device for processing a virtual card. The device includes a first receiving module 301, a transferring module 302, a first obtaining module 303, a second obtaining module 304 and a storing module 305.

The first receiving module 301 is configured to receive a transfer request from a terminal, in which the transfer request carries a user ID of a first user, a user ID of a second user, and a virtual card ID of the first user.

The transferring module 302 is configured to transfer a virtual card from the user account of the first user to the user account of the second user, based on the user ID of the first user, the user ID of the second user and the virtual card ID.

The first obtaining module 303 is configured to obtain an image for transferring the virtual card, in which the image at least includes the user ID of the first user, the user ID of the second user, the virtual card ID and resource value of the virtual card.

The second obtaining module 304 is configured to obtain an image library of the virtual card.

The storing module 305 is configured to store a corresponding relationship between an image ID and an image into the image library of the virtual card.

Preferably, the device further includes a second receiving module, a third obtaining module and a transmitting module.

The second receiving module is configured to receive a query request from a terminal, in which the query request carries the virtual card ID and the image ID.

The third obtaining module is configured to obtain the image library of the virtual card, based on the virtual card ID, and obtain the image corresponding to the image ID from the image library of the virtual card.

The transmitting module is configured to transmit the obtained image to the terminal.

Preferably, the first obtaining module 303 includes a first obtaining unit and a generating unit.

The first obtaining unit is configured to obtain resource value of the virtual card from a corresponding relationship, which is between a virtual card ID of a virtual card and a resource value of the virtual card, based on the virtual card ID.

The generating unit is configured to generate an image for transferring the virtual card, based on the user ID of the first user, the user ID of the second user, the virtual card ID and the resource value of the virtual card.

Preferably, the transferring module 302 includes a second obtaining unit and a modifying unit.

The second obtaining unit is configured to obtain an account relationship table. The account relationship table is configured to store a corresponding relationship, which is between a virtual card ID and a user ID of a user.

The modifying unit is configured to replace a first corresponding relationship in the account relationship table with a second corresponding relationship. The first corresponding relationship is between the virtual card ID and the user ID of the first user. The second corresponding relationship is between the virtual card ID and the user ID of the second user.

Preferably, the second obtaining module 304 includes a determining unit, a third obtaining unit and a creating unit.

The determining unit is configured to determine whether a server includes an image library of the virtual card, based on the virtual card ID.

When the server includes the image library of the virtual card, the third obtaining unit is configured to obtain the image library of the virtual card from the server.

When the server does not include the image library of the virtual card, the creating unit is configured to create an image library of the virtual card.

In the present disclosure, receive the transfer request from the terminal. The transfer request carries the user ID of the first user, the user ID of the second user, and the virtual card ID of the first user. Transfer the virtual card from the user account of the first user to the user account of the second user, based on the user ID of the first user, the user ID of the second user and the virtual card ID. Obtain the image for transferring the virtual card, in which the image at least includes the user ID of the first user, the user ID of the second user, the virtual card ID, and resource value of the virtual card. Obtain the image library of the virtual card, store a corresponding relationship between image ID and image into the image library of the virtual card. By adopting the present disclosure, a virtual card of the first user may be transferred to the second user, and the image for transferring the virtual card may be stored.

Embodiment 4

FIG. 4 is a schematic diagram illustrating a structure of a server, in accordance with an embodiment of the present disclosure. Greater differences may be generated, due to various configurations or performances of server 1900. Server 1900 may include at least one central processing unit (CPU) 1922 (e.g., at least one processor) and a memory 1932, and at least one storage medium 1930 (e.g., at least one mass storage device) storing application program 1942 or data 1944. The memory 1932 and storage medium 1930 may be transitory storage or non-transitory storage. Programs stored by the storage medium 1930 may include at least one module (not shown in the figure). Each module may include a series of instruction operations for the server. Moreover, the CPU 1922 may be configured to communicate with the storage medium 1930, and perform a series of instruction operations stored in the storage medium 1930 on the server 1900.

The server 1900 may further include at least one power source 1926, at least one wired or wireless network interface 1950, at least one input/output interface 1958, at least one keyboard 1956, and/or, at least one operating system (OS) 1941, such as, Windows Server™, Mac OS X™, Unix™, Linux™, FreeBSD™, and so on.

The server 1900 may include a memory and at least one program. The at least one program is stored by the memory. The at least one processor is configured to execute the at least one program, which includes instructions for performing the following operations:

receive a transfer request from a terminal, in which the transfer request carries a user ID of a first user, a user ID of a second user, and a virtual card ID of the first user;

transfer the virtual card from the user account of the first user to the user account of the second user, based on the user ID of the first user, the user ID of the second user, and the virtual card ID;

obtain an image for transferring the virtual card, in which the image at least includes the user ID of the first user, the user ID of the second user, the virtual card ID and resource value of the virtual card;

obtain an image library of the virtual card, store a corresponding relationship between an image ID and an image into the image library of the virtual card.

Preferably, after storing the image ID and image into the image library of the virtual card, when executing the at least one program by the at least one processor, the following operations are further executed:

Receive a query request from a terminal, in which the query request carries the virtual card ID and the image ID;

obtain the image library of the virtual card, based on the virtual card ID, and obtain the image corresponding to the image ID from the image library of the virtual card; and, transmit the obtained image to the terminal.

Preferably, the obtaining of the image for transferring the virtual card includes:

obtain resource value of the virtual card from a corresponding relationship, which is between a virtual card ID of a virtual card and a resource value of the virtual card, based on the virtual card ID;

generate the image for transferring the virtual card, based on the user ID of the first user, the user ID of the second user, the virtual card ID, and the resource value of the virtual card.

Preferably, the transferring of the virtual card from the user account of the first user to the user account of the second user, based on the user ID of the first user, the user ID of the second user, and the virtual card ID, includes:

obtain an account relationship table, and the account relationship table is configured to store a corresponding relationship, which is between a virtual card ID and a user ID of a user;

replace a first corresponding relationship in the account relationship table with a second corresponding relationship; in which the first corresponding relationship is between the virtual card ID and the user ID of the first user, the second corresponding relationship is between the virtual card ID and the user ID of the second user.

Preferably, the obtaining of the image library of the virtual card includes:

determine whether a server includes the image library of the virtual card, based on the virtual card ID;

when the server includes the image library of the virtual card, obtain the image library of the virtual card from the server;

when the server does not include the image library of the virtual card, create an image library for the virtual card.

In the present disclosure, receive the transfer request from the terminal. The transfer request carries the user ID of the first user, the user ID of the second user, and the virtual card ID of the first user; transfer the virtual card from the user account of the first user to the user account of the second user, based on the user ID of the first user, the user ID of the second user and the virtual card ID; obtain the image for transferring the virtual card, in which the image at least includes the user ID of the first user, the user ID of the second user, the virtual card ID and resource value of the virtual card; obtain the image library of the virtual card, and store a corresponding relationship between the image ID and the image into the image library of the virtual card. By adopting the present disclosure, a virtual card of the first user is transferred to the second user, and the image for transferring the virtual card may be stored.

It should be noted that, when processing virtual cards by the device provided by foregoing embodiments, descriptions are provided by using an example, in which foregoing each functional module is divided. In practical applications, above functions may be allocated for different functional modules to be completed, based on requirements. That is, divide an internal structure of a device into different functional modules, so as to complete all or some functions described above. In addition, the device for processing virtual cards provided by foregoing embodiment and the method for processing virtual cards provided by foregoing embodiment belong to the same idea. The specific implementation process of the device refers to method embodiments, which is not repeated here.

In the embodiment of the present disclosure, the item-transaction processing method may be executed by an item-transaction processing device. The item-transaction processing device may be implemented in a server, which is in charge of managing item data in an Internet background, such as: an IM server, a Social Networking Service (SNS) server, or a network game server.

Figure 5:
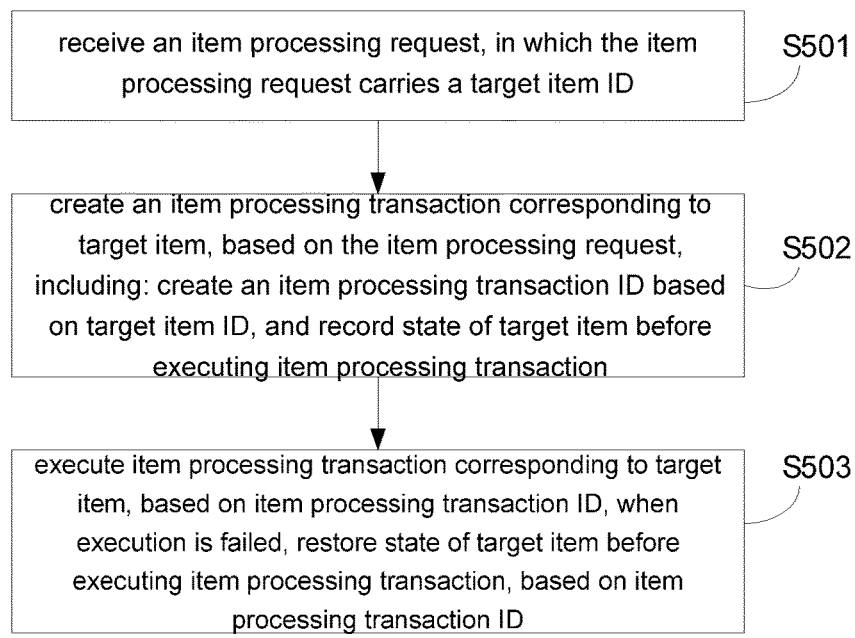
FIG. 5 is a flowchart illustrating a method for processing an item transaction, in accordance with an embodiment of the present disclosure.

FIG. 5 is a flowchart illustrating a method for processing an item transaction, in accordance with an embodiment of the present disclosure. As shown in FIG. 5, the method for processing the item transaction in the embodiment may include the following blocks.

In block S501: receive an item processing request, in which the item processing request carries a target item ID.

Specifically, the item-transaction processing device may receive an item processing request submitted by a user terminal, to request performing a corresponding process on an item associated with the user account of the user terminal. For example, the item-transaction processing device transmits item information associated with the user account of the user terminal to the user terminal. After displaying the item information associated with the user account of the user terminal, the user terminal obtains a transaction operation instruction inputted by a user for the item information, so as to submit a corresponding item processing request to the item-transaction processing device, on the basis of the transaction operation instruction. The item processing request may include an item transfer request, an item delete request, an item usage request, an item data change request, and so on. Furthermore, in other alternative embodiments, the item-transaction processing device may also obtain an item processing request with other modes, e.g., a third-party server, which establishes an associated relationship in advance, transmits an item processing request to the item-transaction processing device in the embodiment of the present disclosure, based on an action event occurs in a corresponding client of the user.

Furthermore, when the item processing request is an item transfer request, the item transfer request further needs to carry a target item ID, a transferer account ID, and a transferee account ID. The transferer account ID may be an account ID, which corresponds to the user account of the user terminal submitting the item transfer request.

The target item may be a virtual card, and so on. For example, the item processing request may be a transfer request for the virtual card. That is, the first user gives the virtual card to another user as a present. Alternatively, the item processing request may be a transfer request for resource value in the virtual card. That is, the first user gives some or all the resource values corresponding to the virtual card to another user as a gift. The specific implementation process may refer to Embodiments 1 and 2, which is not repeated here. The specific implementation may be executed by the device or server in the Embodiment 3 or 4. For any embodiment illustrated with FIG. 6 to FIG. 11, the target item and item processing request may be similar with that in the embodiment.

In block S502, create an item processing transaction corresponding to the target item, based on the item processing request, which includes: create an item processing transaction ID, based on the target item ID; and record state of the target item before executing the item processing transaction.

In the embodiments of the present disclosure, for each target item, the item-transaction processing device may manage a corresponding item processing transaction. For example, the item-transaction processing device maintains an independent transaction queue for each target item, and guarantees that item processing transactions of different items do not interfere with each other. When receiving an item processing request, the item-transaction processing device may create an item processing transaction corresponding to the target item, based on the carried target item ID, which includes: create an item processing transaction ID, based on the target item ID, for example, the item processing transaction ID may adopt target item ID+type ID of processing transaction+created time information, so as to rapidly search out the item processing transaction of the target item, based on the target item ID.

Contents of the item processing transaction may include multiple processing blocks, which are necessary to be performed by the item-transaction processing device on the target item, based on the item processing request. For example, the item delete transaction, which is created based on the item delete request, may indicate to delete an associated relationship between current associated account and the target item. For another example, the item transfer transaction, which is created based on the item transfer request, may indicate to remove an associated relationship between a transferer account and a target item, and create an associated relationship between a transferee account and the target item. The item usage transaction, which is created based on the item usage request, may indicate to create an item usage event, and update an item usage record, and so on. State of the target item may include associated state, usage record and item data, and so on. The associated state is user account information currently associated with the item.

In block S503: execute an item processing transaction corresponding to the target item, based on the item processing transaction ID. When execution is failed, restore state of the target item before executing the item processing transaction, based on the item processing transaction ID.

Specifically, the item-transaction processing device records the state of the target item before executing the item processing transaction, and then, executes the created item processing transaction, based on the item processing transaction ID, e.g., inserts the item processing transaction into an item-processing transaction list corresponding to the target item. When the item processing transaction is not completed within a preset execution period (such as 5 seconds, 30 seconds), or, after the failed initial execution and number of re-executions exceeds a preset threshold, determine that the execution is failed. Furthermore, obtain state of the target item before executing the item processing transaction, based on the item processing transaction ID, so as to restore state of the target item before executing the item processing transaction.

In the item-transaction processing method provided by embodiments of the present disclosure, create a corresponding item processing transaction based on the target item, and record the state of the target item before executing the item processing transaction, so as to effectively guarantee independence and stability of item transaction execution.

Figure 6:
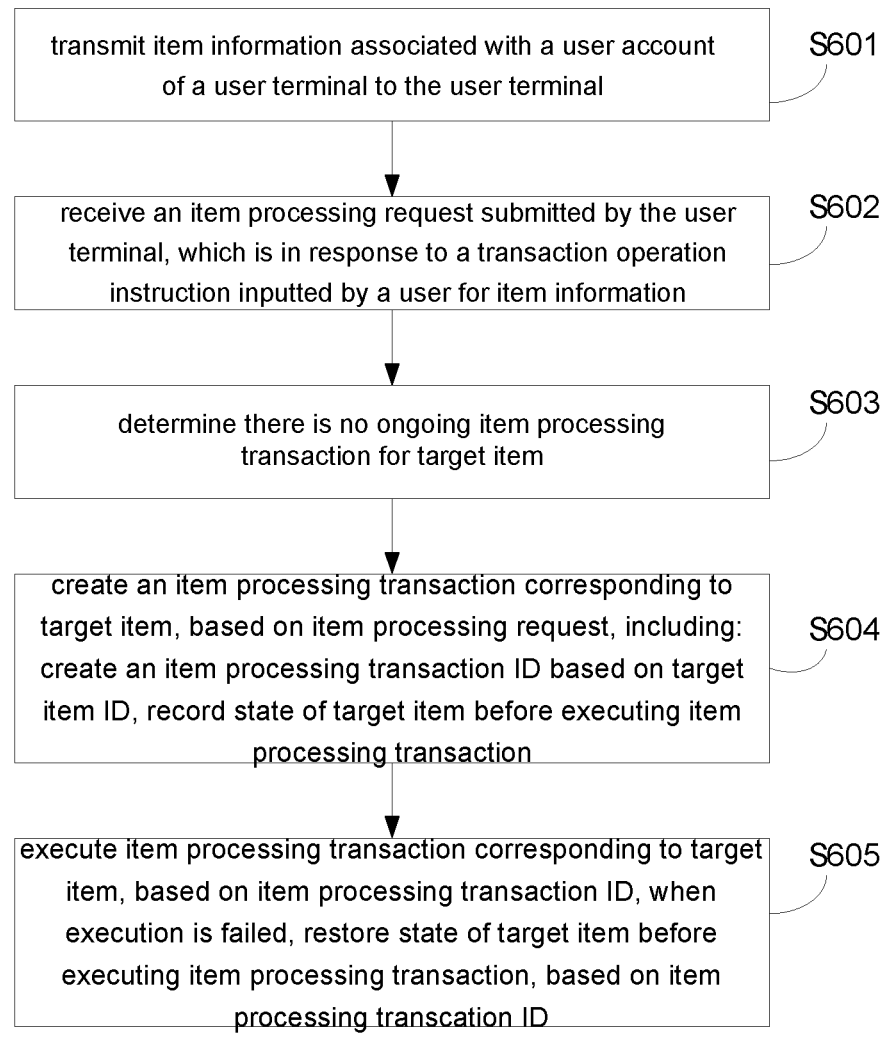
FIG. 6 is a flowchart illustrating a method for processing an item transaction, in accordance with another embodiment of the present disclosure.

FIG. 6 is a flowchart illustrating a method for processing an item transaction, in accordance with another embodiment of the present disclosure. As shown in FIG. 6, the method may include the following blocks.

In block S601: transmit item information associated with a user account of a user terminal to the user terminal.

Specifically, the item-transaction processing device may search for item information associated with the user account, based on the user account used by the user terminal, and transmit the item information associated with the user account of the user terminal to the user terminal, and enable the user terminal to display the item information associated with the user account of the user terminal.

In block S602: receive an item processing request submitted by the user terminal, in response to an item operation instruction inputted by a user for the item information.

In block S603: determine that there is no ongoing item processing transaction for the target item currently.

In the embodiments of the present disclosure, the item-transaction processing device may manage a corresponding item processing transaction for each target item, for example, maintain an independent transaction queue for each target item, and guarantee that item processing transactions of different items do not interfere with each other. Furthermore, the item-transaction processing device may rapidly search out whether there is an ongoing item processing transaction for the target item, based on the target item ID. When there is an ongoing item processing transaction, the item-transaction processing device may wait for completion of the ongoing item processing transaction, or return a failed transaction processing to the user terminal.

In block S604: create an item processing transaction corresponding to the target item, based on the item processing request, and record state of the target item before executing the item processing transaction.

When receiving the item processing request, the item-transaction processing device may create an item processing transaction corresponding to the target item, based on the carried target item ID, including: create an item processing transaction ID based on the target item ID. For example, the item processing transaction ID may adopt: target item ID+type ID of processing transaction+create time information.

Figure 7:
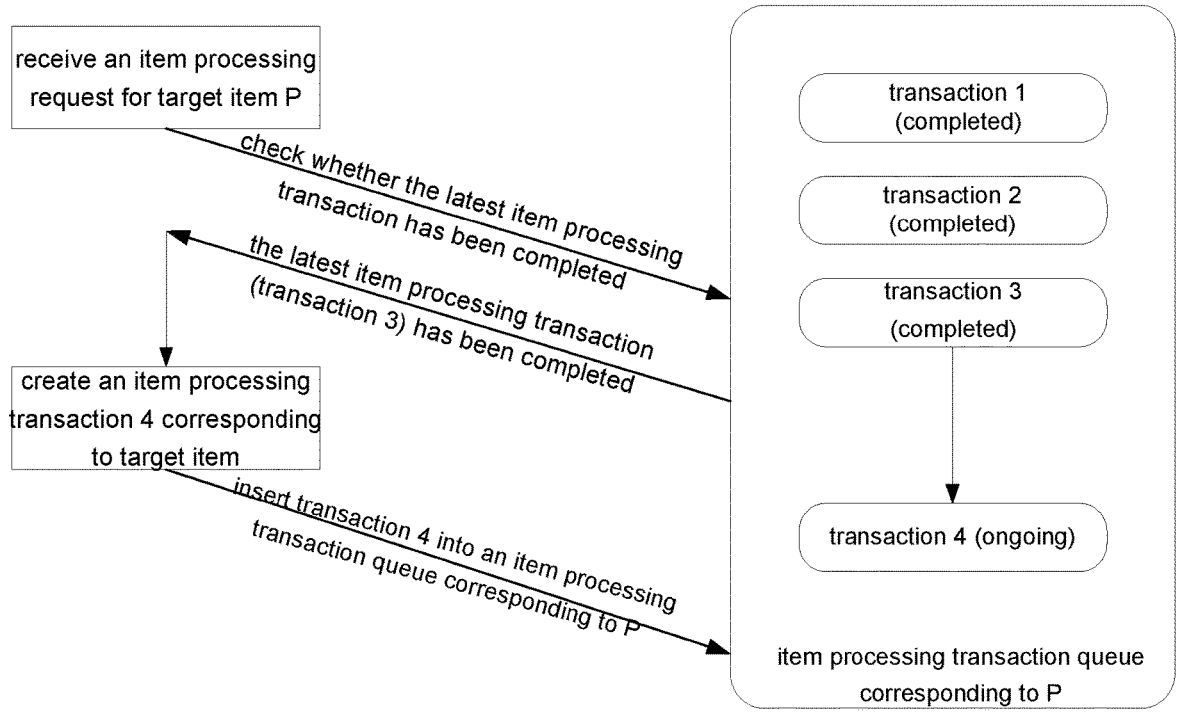
FIG. 7 is a schematic diagram illustrating how to create an item processing transaction corresponding to a target item, in accordance with an embodiment of the present disclosure.
Figure 8:
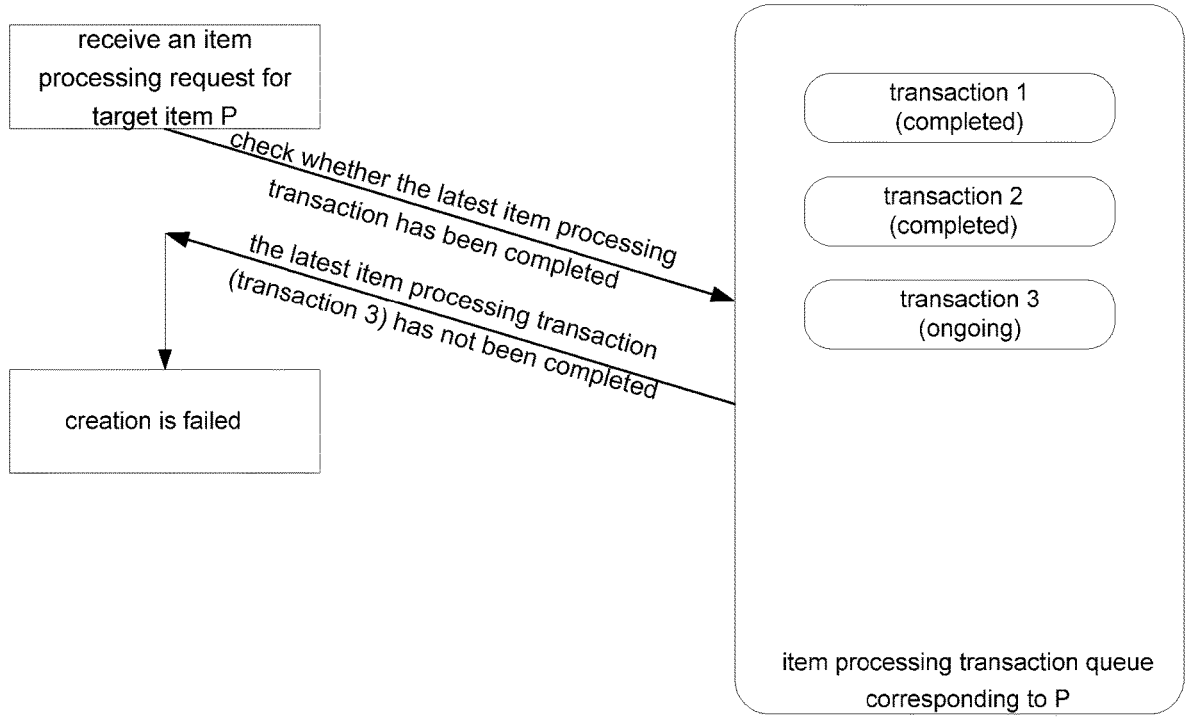
FIG. 8 is a schematic diagram illustrating how to create an item processing transaction corresponding to a target item, in accordance with another embodiment of the present disclosure.

In specific implementations, refer to the processes for creating an item processing transaction corresponding to the target item in FIG. 7 and FIG. 8. In the embodiment, the item processing transaction created for target item P is managed by the item processing transaction list thereof.

In the case shown in FIG. 7, when receiving the item processing request for target item P, check the item processing transaction list of target item P, and determine whether there is ongoing item processing transaction therein. That is, whether the latest item processing transaction has been completed. At this time, the item processing transaction list includes transactions 1, 2 and 3. The latest transaction 3 has already been completed. Subsequently, determine that the latest item processing transaction has already been completed, so as to create an item processing transaction 4 corresponding to target item P, based on the item processing request. Furthermore, insert the transaction 4 into the item processing transaction list of target item P.

In the case shown in FIG. 8, when receiving the item processing request for target item P, check the item processing transaction list of the target item P, determine whether the latest item processing transaction therein has already been completed. At this time, the item processing transaction list includes transactions 1, 2 and 3. The latest transaction 3 is ongoing. Subsequently, determine that the latest item processing transaction has not been completed. At this time, in order to guarantee not to modify core resources of the target item P, and not to affect executions of other item processing transactions, reject creating an item processing transaction corresponding to the target item P, based on the item processing request.

In block S605: execute the item processing transaction corresponding to the target item, based on the item processing transaction ID; when execution is failed, restore state of the target item before executing the item processing transaction, based on the item processing transaction ID.

Specifically, the item-transaction processing device records state of the target item before executing the item processing transaction, and then, executes the created item processing transaction, based on the item processing transaction ID. For example, the item-transaction processing device inserts the item processing transaction into the item processing transaction list corresponding to the target item; when not complete the item processing transaction within a preset execution period (e.g., 5 seconds, 30 seconds), or, after a failed initial execution and number of re-executions exceeds a preset threshold, determine that the execution is failed. Furthermore, obtain state of the target item before executing the item processing transaction, based on the item processing transaction ID, so as to restore the state of the target item before executing the item processing transaction.

In the item-transaction processing method provided by the embodiments of the present disclosure, create the item processing transaction corresponding to the target item; before executing the item processing transaction, record the state of the target item, so as to effectively guarantee independence and stability of item transaction execution.

Figure 9:
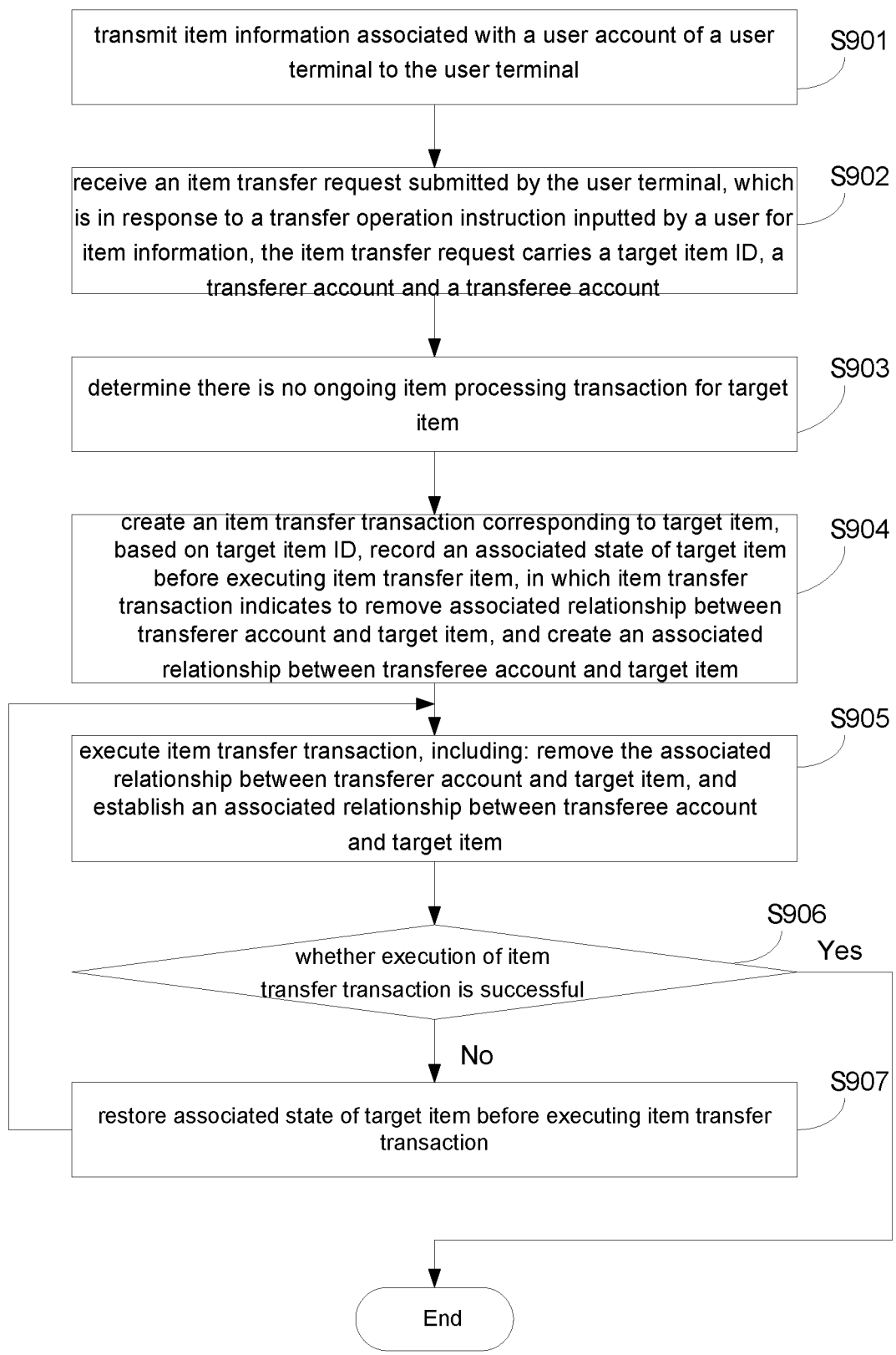
FIG. 9 is a flowchart illustrating a method for processing an item transaction, in accordance with another embodiment of the present disclosure.

FIG. 9 is a flowchart illustrating a method for processing an item transaction, in accordance with another embodiment of the present disclosure. As shown in FIG. 9, the method may include the following blocks.

In block S901: transmit item information associated with a user account of a user terminal to the user terminal.

In block S902: receive an item transfer request submitted by the user terminal, in response to an item operation instruction inputted by a user for the item information, in which the item transfer request carries a target item ID, a transferer account ID, and a transferee account ID.

In block S903: determine that there is no ongoing item processing transaction for the target item.

In the embodiments of the present disclosure, the item-transaction processing device may manage an item processing transaction corresponding to each target item, for example, maintains an independent transaction queue for each target item, so as to guarantee that item processing transactions of different items do not interfere with each other. Furthermore, the item-transaction processing device may rapidly search out whether there is ongoing item processing transaction for the target item, based on the target item ID; when there is ongoing item processing transaction, the item-transaction processing device may wait for completion of the ongoing item processing transaction; or, returns a failed transaction processing to the user terminal.

In block S904: create an item transfer transaction corresponding to the target item, based on the target item ID, and record an associated state of the target item before executing the item transfer transaction, in which the item transfer transaction indicates to remove an associated relationship between transferer account and target item, and create an associated relationship between transferee account and target item.

Create the item processing transaction corresponding to the target item, including: create an item processing transaction ID based on the target item ID; for example, the item processing transaction ID may adopt target item ID+type ID of processing transaction+create time information.

In block S905: execute the item transfer transaction corresponding to the target item, based on the item transfer transaction ID, which includes: remove the associated relationship between transferer account and target item, and establish an associated relationship between transferee account and the target item.

In block S906: determine whether execution of the item transfer transaction is successful; if yes, terminate the process; otherwise, proceed with block S907.

Specifically, when not complete the item processing transaction within a preset execution period, or after a failed initial execution and number of re-executions has exceeded a preset threshold, determine that the execution is failed.

In block S907: restore the associated state of the target item before executing the item transfer transaction, based on the item transfer transaction ID.

Alternatively, after restoring the associated state of the target item before executing the item transfer transaction, proceed with block S905 once again. In other alternative embodiments, return a failed item processing to the user terminal.

In the method for processing item transactions provided by embodiments of the present disclosure, create an item processing transaction corresponding to the target item, and before executing the item processing transaction, record the state of the target item, so as to efficiently guarantee independence and stability of item transaction execution.

Figure 10:
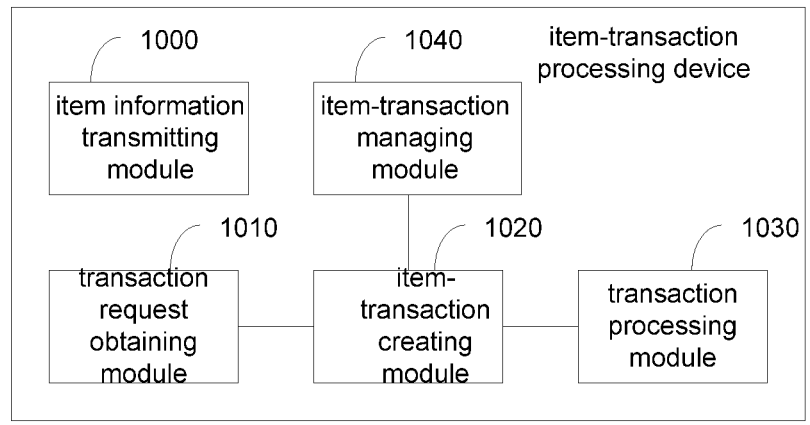
FIG. 10 is a schematic diagram illustrating structure of a device for processing an item transaction, in accordance with an embodiment of the present disclosure.

FIG. 10 is a schematic diagram illustrating a structure of an item-transaction processing device, in accordance with an embodiment of the present disclosure. As shown in FIG. 10, the item-transaction processing device in the embodiment of the present disclosure includes a transaction request obtaining module 1010.

The transaction request obtaining module 1010 is configured to receive an item processing request, in which the item processing request carries a target item ID.

Specifically, the transaction request obtaining module 1010 may receive the item processing request submitted by a user terminal, to request performing a corresponding process on an item associated with the user account of the user terminal. In other alternative embodiments, the transaction request obtaining module 1010 may also obtain the item processing request with other modes, e.g., a third-party server, which establishes an associated relationship in advance, transmits an item processing request to the item-transaction processing device in the embodiment of the present disclosure, based on an action event occurred in a corresponding client.

Furthermore, when the item processing request is an item transfer request, the item transfer request may also carry a target item ID, a transferer account ID and a transferee account ID. The transferer account ID may be an account ID, which corresponds to the user account of the user terminal submitting the item transfer request.

The item-transaction processing device further includes an item-transaction creating module 1020. The item-transaction creating module 1020 is configured to create an item processing transaction corresponding to the target item, based on the item processing request, which includes: the item-transaction creating module 1020 creates an item processing transaction ID based on the target item ID, and records state of the target item before executing the item processing transaction.

In the embodiments of the present disclosure, the item-transaction processing device may manage an item processing transaction corresponding to each target item, e.g., maintains an independent transaction queue for each target item, so as to guarantee that item processing transactions of various items do not interfere with each other. When receiving the item processing request, the item-transaction creating module 1020 may create an item processing transaction corresponding to the target item, based on the carried target item ID. The item-transaction creating module 1020 creates the item processing transaction ID, based on the target item ID. For example, the item processing transaction ID may adopt: target item ID+type ID of processing transaction+ create time information, so as to rapidly search out the item processing transaction of the target item, based on the target item ID.

Contents of the item processing transaction created by the item-transaction creating module 1020 may include multiple processing blocks, which are necessary to be executed for the target item based on the item processing request. For example, an item delete transaction, which is created based on an item delete request, may indicate to remove an associated relationship between current associated account and target item. For another example, an item transfer transaction, which is created based on an item transfer request, may indicate to remove an associated relationship between transferer account and target item, and create an associated relationship between transferee account and target item. An item usage transaction, which is created based on an item usage request, may indicate to create an item usage event, update an item usage record, and so on. The state of the target item may include an associated state, a usage record, item data, and so on. The associated state is user account information currently associated with the item.

The item-transaction processing device further includes a transaction processing module 1030. The transaction processing module 1030 is configured to execute the item processing transaction corresponding to the target item, based on the item processing transaction ID. When execution is failed, restore the state of the target item before executing the item processing transaction, based on the item processing transaction ID.

Specifically, the transaction processing module 1030 may execute the created item processing transaction, based on the item processing transaction ID, e.g., inserts the item processing transaction into an item processing transaction list corresponding to the target item; when not complete the item processing transaction within a preset execution period (such as, 5 seconds, 30 seconds), or, after a failed initial execution and number of re-executions has exceeded a preset threshold, determine that execution is failed. Furthermore, the transaction processing module 1030 may obtain state of the target item before executing the item processing transaction, based on the item processing transaction ID, so as to restore the state of the target item before executing the item processing transaction.

In an alternative embodiment, the item-transaction processing device may further include an item information transmitting module 1000, which is configured to transmit item information associated with the user account of the user terminal to the user terminal.

Specifically, the item information transmitting module 1000 may search out item information associated with the user account, based on the user account used by the user terminal, and transmit the item information associated with the user account of the user terminal to the user terminal, such that the user terminal displays the item information associated with the user account of the user terminal.

Furthermore, the transaction request obtaining module 1010 is configured to:

receive the item processing request, which is submitted by the user terminal in response to a transaction operation instruction for the item information inputted by a user; the item processing request may include an item transfer request, an item delete request, an item usage request, an item data change request, and so on.

In an alternative embodiment, the item-transaction processing device may further include an item-transaction managing module 1040. The item-transaction managing module 1040 is configured to determine whether there is ongoing item processing transaction for the target item, after receiving the item processing request. When there is no ongoing item processing transaction for the target item, the item-transaction managing module 1040 is configured to trigger the item-transaction creating module 1020 to create an item processing transaction corresponding to the target item, based on the item processing request, and record state of the target item before executing the item processing transaction.

In the embodiments of the present disclosure, the item-transaction processing device creates an item processing transaction corresponding to the target item, based on the target item, and records state of the target item before executing the item processing transaction, so as to effectively guarantee independence and stability of item transaction execution.

Figure 11:
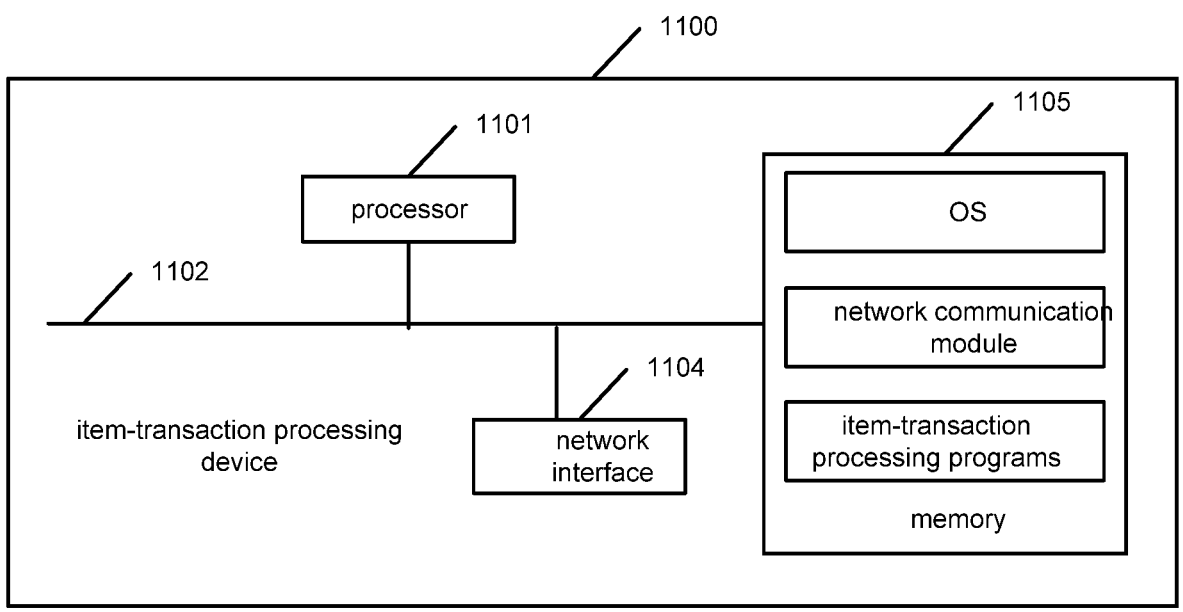
FIG. 11 is a schematic diagram illustrating structure of a device for processing an item transaction, in accordance with another embodiment of the present disclosure.

FIG. 11 is a schematic diagram illustrating a structure of an item-transaction processing device, in accordance with another embodiment of the present disclosure. As shown in FIG. 11, the item-transaction processing device 1100 may include: at least one processor 1101, such as CPU, at least one network interface 1104, a memory 1105, and at least one communication bus 1102. The communication bus 1102 is configured to implement connection and communication among these components. The network interface 1104 may include a standard wired interface, a wireless interface (such as a WI-FI interface). The memory 1105 may be a high-speed random access memory (RAM), or a non-volatile memory, e.g., at least one disk memory. The memory 1105 may also be a storage device, which is remote from foregoing processor 1101. As shown in FIG. 11, the memory 1105, which is taken as a computer storage medium, may include an OS, a network communication module, and an item-transaction processing program.

In the item-transaction processing device 1100 shown in FIG. 11, the processor 1101 may be configured to call the item transaction processing program stored in the memory 1105, and then the following blocks are executed.

Receive an item processing request via the network interface 1104, in which the item processing request carries a target item ID;

create an item processing transaction corresponding to the target item, based on the item processing request, which includes: create an item processing transaction ID based on the target item ID, and record state of the target item before executing the item processing transaction;

execute the item processing transaction corresponding to the target item, based on the item processing transaction ID; when execution is failed, restore the state of the target item before executing the item processing transaction, based on the item processing transaction ID.

In an alternative embodiment, the item processing request includes an item transfer request, in which the item transfer request carries a target item ID, a transferer account ID and a transferee account ID;

when receiving the item transfer request, create an item processing transaction corresponding to the target item, based on the item processing request, which includes: create the item processing transaction ID based on the target item ID, and record state of the target item before executing the item processing transaction, including:

create an item transfer transaction corresponding to the target item, based on the target item ID, including: create the item transfer transaction ID based on the target item ID, and record the associated state of the target item before executing the item transfer transaction, in which the item transfer transaction indicates to remove an associated relationship between the transferer account and the target item, and establish an associated relationship between the transferee account and the target item;

execute the item processing transaction corresponding to the target item, based on the item processing transaction ID, when execution is failed, restore the state of the target item before executing the item processing transaction, based on the item processing transaction ID, including:

execute the item transfer transaction corresponding to the target item, based on the item transfer transaction ID, when execution is failed, restore the state of the target item before executing the item transfer transaction, based on the item transfer transaction ID.

In an alternative embodiment, before creating the item processing transaction corresponding to the target item, based on the item processing request, the method further includes:

determine whether there is ongoing item processing transaction for the target item.

In an alternative embodiment, before receiving the item processing request, in which the item processing request carries the target item ID, the method further includes:

transmit item information associated with the user account of the user terminal to the user terminal;

receive an item processing request submitted by the user terminal, which is in response to a transaction operation instruction inputted by a user for the item information.

In the embodiments of the present disclosure, the item-transaction processing device creates an item processing transaction corresponding to the target item, based on the target item, and records the state of the target item before executing the item processing transaction, so as to effectively guarantee independence and stability of item transaction execution.

Persons having ordinary skill in the art may understand that, all the blocks or some blocks in the method of foregoing embodiments may be completed, by instructing related hardware with a computer program. The computer program may be stored into a computer readable storage medium. When executing the program, blocks of each method provided by foregoing embodiments may be performed. The storage medium may be a disk, a compact disk (CD), a read-only memory (ROM) or a random access memory (RAM), and so on.

The foregoing are only preferred embodiments of the present disclosure, which are not for use in limiting the present disclosure. Any modifications, equivalent substitutions, or improvements made within the spirit and principle of the present disclosure, should be covered by the protection scope of the present disclosure.

The invention claimed is:

1. A method for processing a virtual card, comprising:
    receiving, by a server, a transfer request from a terminal of a first user, wherein the transfer request includes a user identity (ID) of the first user, a user ID of a second user, and a virtual card ID;
    after receiving the transfer request, recording, by the server, a state of the virtual card, the state of the virtual card including a correlation between the first user and the virtual card, and a correlation between the second user and the virtual card, wherein recording the state of the virtual card includes:
  obtaining an account relationship table, wherein the account relationship table is configured to store a corresponding relationship between a virtual card ID and a user ID of a user; and
  replacing a first corresponding relationship in the account relationship table with a second corresponding relationship, wherein the first corresponding relationship is between the virtual card ID and the user ID of the first user, and the second corresponding relationship is between the virtual card ID and the user ID of the second user; and
after recording the state of the virtual card, transferring, by the server, an associated state of the virtual card from a user account of the first user to a user account of the second user, based on the user ID of the first user, the user ID of the second user, and the virtual card ID, wherein the transferring the associated state of the virtual card includes determining whether the transferring has failed or succeeded, and:
  when the transferring has failed, returning, by the server, the virtual card back to the user account of the first user by replacing the second corresponding relationship in the account relationship table with the first corresponding relationship, wherein the second corresponding relationship is between the virtual card ID and the user ID of the second user, and wherein the first corresponding relationship is between the virtual card ID and the user ID of the first user; and
  when the transferring has succeeded, generating, by the server, an image of the virtual card, and transmitting, by the server, the image of the virtual card to a terminal of the second user, wherein the image as displayed at the terminal of the second user shows the user ID of the first user, the user ID of the second user, the virtual card ID, a resource value of the virtual card, and a transfer time at which the virtual card is transferred from the user account of the first user to the user account of the second user.

2. The method according to claim 1, further comprising:
after storing an image ID and the image of the virtual card into an image library of the virtual card, receiving a query request from the terminal of the first user, wherein the query request includes the virtual card ID and the image ID;
obtaining the image library of the virtual card based on the virtual card ID, and obtaining an image corresponding to the image ID from the image library of the virtual card; and
transmitting the image corresponding to the image ID as obtained to the terminal of the first user.

3. The method according to claim 2, wherein obtaining the image corresponding to the image ID for transferring the virtual card comprises:
obtaining the resource value of the virtual card from a corresponding relationship, which is between a virtual card ID of a virtual card and the resource value of the virtual card, based on the virtual card ID; and
generating the image corresponding to the image ID for transferring the virtual card, based on the user ID of the first user, the user ID of the second user, the virtual card ID, and the resource value of the virtual card.

4. The method according to claim 2, wherein obtaining the image library of the virtual card comprises:

determining whether the server comprises the image library of the virtual card, based on the virtual card ID; and
when determining that the server comprises the image library of the virtual card, obtaining the image library of the virtual card from the server;
when determining that the server does not comprise the image library of the virtual card, creating the image library for the virtual card.

5. The method according to claim 1, wherein the transfer request further includes a request and a reply, wherein the request includes the user ID of the first user and the user ID of the second user, wherein the reply includes the virtual card ID of the first user, and wherein the method further comprises:
identifying multiple virtual card IDs correlating to the user ID of the first user from the account relationship table; and
receiving from the terminal of the first user the reply including a selection of the virtual card ID from the multiple virtual card IDs.

6. The method according to claim 1, wherein the user ID of the first user includes a name of the first user, and the user ID of the second user includes a name of the second user.

7. The method according to claim 1, further comprising:
receiving, by the server, a second transfer request from the terminal of the second user, wherein the second transfer request includes the user ID of the second user, a user ID of a third user, and the virtual card ID;
recording a second state of the virtual card;
after recording the second state of the virtual card, transferring the virtual card from the user account of the second user to a user account of the third user;
generating a second image for transferring the virtual card, wherein the second image includes the user ID of the second user, the user ID of the third user, the virtual card ID, and a second resource value of the virtual card; and
storing the second image into the image library of the virtual card.

8. The method according to claim 7, further comprising:
sending to the terminal of the second user both the first image and the second image of the virtual card.

9. The method according to claim 1, wherein the terminal of the first user is a first terminal, and wherein prior to transferring the virtual card from the user account of the first user to the user account of the second user, the method further comprises:
receiving a second transfer request from the first terminal for transferring a portion of the resource value from the virtual card of the first user to a virtual card of a third user.

10. A device for processing a virtual card, comprising:
a processor; and
a memory for storing instructions executable by the processor, wherein when executing the instructions, the processor is configured to:
  receive a transfer request from a terminal of a first user, wherein the transfer request includes a user identity (ID) of a first user, a user ID of a second user, and a virtual card ID;
  after receiving the transfer request, record a state of the virtual card, the state of the virtual card including a correlation between the first user and the virtual card, and a correlation between the second user and the virtual card, wherein recording the state of the virtual card includes:

obtaining an account relationship table, wherein the account relationship table is configured to store a corresponding relationship between a virtual card ID and a user ID of a user; and replacing a first corresponding relationship in the account relationship table with a second corresponding relationship, wherein the first corresponding relationship is between the virtual card ID and the user ID of the first user, and the second corresponding relationship is between the virtual card ID and the user ID of the second user; and after recording the state of the virtual card, transfer an associated state of the virtual card from a user account of the first user to a user account of the second user, based on the user ID of the first user, the user ID of the second user, and the virtual card ID, wherein transferring the associated state of the virtual card includes determining whether the transferring has failed or succeeded, and;

when the transferring has failed, returning the virtual card back to the user account of the first user by replacing the second corresponding relationship in the account relationship table with the first corresponding relationship, wherein the second corresponding relationship is between the virtual card ID and the user ID of the second user, and wherein the first corresponding relationship is between the virtual card ID and the user ID of the first user; and when the transferring has succeeded, generating an image of the virtual card, and transmitting the image of the virtual card to a terminal of the second user, wherein the image as displayed at the terminal of the second user shows the user ID of the first user, the user ID of the second user, the virtual card ID, a resource value of the virtual card, and a transfer time at which the virtual card is transferred from the user account of the first user to the user account of the second user.

11. The device according to claim 10, wherein when executing the instructions, the processor is further configured to:

after storing an image ID and the image of the virtual card into an image library of the virtual card, receive a query request from the terminal of the first user, wherein the query request includes the virtual card ID and the image ID;

obtain the image library of the virtual card based on the virtual card ID, and obtain an image corresponding to the image ID from the image library of the virtual card; and transmit the image corresponding to the image ID as obtained to the terminal of the first user.

12. The device according to claim 11, wherein when executing the instructions, the processor is further configured to:

obtain the resource value of the virtual card from a corresponding relationship, which is between a virtual card ID of a virtual card and the resource value of the virtual card, based on the virtual card ID; and generate the image corresponding to the image ID for transferring the virtual card, based on the user ID of the first user, the user ID of the second user, the virtual card ID, and the resource value of the virtual card.

13. The device according to claim 11, wherein when executing the instructions, the processor is further configured to:

determine whether a server comprises the image library of the virtual card, based on the virtual card ID;

when determining that the server comprises the image library of the virtual card, obtain the image library of the virtual card from the server; and when determining that the server does not comprise the image library of the virtual card, create the image library for the virtual card.

14. The device according to claim 10, wherein the transfer request further includes a request and a reply, wherein the request includes the user ID of the first user and the user ID of the second user, wherein the reply includes the virtual card ID of the first user, and wherein when executing the instructions, the processor is further configured to:

identify multiple virtual card IDs correlating to the user ID of the first user from the account relationship table; and receive from the terminal of the first user the reply including a selection of the virtual card ID from the multiple virtual card IDs.

* * * * *